US010462467B2

(12) United States Patent
Zhang et al.

(10) Patent No.: US 10,462,467 B2
(45) Date of Patent: *Oct. 29, 2019

(54) REFINING FILTER FOR INTER LAYER PREDICTION OF SCALABLE VIDEO CODING

(71) Applicant: Intel Corporation, Santa Clara, CA (US)

(72) Inventors: Wenhao Zhang, Beijing (CN); Yi-Jen Chiu, San Jose, CA (US); Lidong Xu, Beijing (CN); Zhipin Deng, Beijing (CN); Yu Han, Beijing (CN); Xiaoxia Cai, Beijing (CN); Hong Jiang, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 69 days.

This patent is subject to a terminal disclaimer.

(21) Appl. No.: 15/433,851

(22) Filed: Feb. 15, 2017

(65) Prior Publication Data

US 2017/0163989 A1 Jun. 8, 2017

Related U.S. Application Data

(63) Continuation of application No. 13/856,212, filed on Apr. 3, 2013, now Pat. No. 9,596,465.
(Continued)

(51) Int. Cl.
*H04N 19/159* (2014.01)
*H04N 19/503* (2014.01)
(Continued)

(52) U.S. Cl.
CPC ......... *H04N 19/159* (2014.11); *H04N 19/105* (2014.11); *H04N 19/117* (2014.11);
(Continued)

(58) Field of Classification Search
CPC .... H04N 19/86; H04N 19/117; H04N 19/186; H04N 19/0089; H04N 19/30;
(Continued)

(56) References Cited

U.S. PATENT DOCUMENTS 5,278,915 A 1/1994 Chupeau et al.
7,460,596 B2 * 12/2008 Kwon ................ H04N 19/159
375/240.03
(Continued)

FOREIGN PATENT DOCUMENTS

JP 2006295913 10/2006
TW 200727709 7/2007
(Continued)

OTHER PUBLICATIONS

Advisory Action for U.S. Appl. No. 13/856,212, notified Mar. 9, 2016.
(Continued)

*Primary Examiner* — Dramos Kalapodas
(74) *Attorney, Agent, or Firm* — Green, Howard & Mughal LLP

(57) ABSTRACT

Techniques involving inter layer prediction of scalable video coding are described. Such techniques may employ refining filters.

15 Claims, 10 Drawing Sheets

Related U.S. Application Data

(60) Provisional application No. 61/749,000, filed on Jan. 4, 2013.

(51) Int. Cl.

| | | |
|---|---|---|
| *H04N 19/61* | (2014.01) | |
| *H04N 19/117* | (2014.01) | |
| *H04N 19/33* | (2014.01) | |
| *H04N 19/59* | (2014.01) | |
| *H04N 19/105* | (2014.01) | |
| *H04N 19/14* | (2014.01) | |
| *H04N 19/176* | (2014.01) | |
| *H04N 19/182* | (2014.01) | |
| *H04N 19/184* | (2014.01) | |

(52) U.S. Cl.
CPC ............. *H04N 19/14* (2014.11); *H04N 19/33* (2014.11); *H04N 19/503* (2014.11); *H04N 19/59* (2014.11); *H04N 19/61* (2014.11); *H04N 19/176* (2014.11); *H04N 19/182* (2014.11); *H04N 19/184* (2014.11)

(58) Field of Classification Search
CPC ...... H04N 19/70; H04N 19/31; H04N 19/503; H04N 19/80; H04N 7/26; H04N 19/87; H04N 19/63; H04N 19/82; H04N 19/59; H04N 19/61; H04N 19/33; H04N 19/187; H04N 19/46; H04N 19/182; H04N 19/137; H04N 19/179; H04N 19/105; H04N 19/159; H04N 19/14; H04N 19/176; H04N 19/184; G06T 9/00; H03H 17/0294; H03H 2017/0297
See application file for complete search history.

(56) References Cited

U.S. PATENT DOCUMENTS

| | | |
|---|---|---|
| 7,876,833 B2 | 1/2011 | Segall et al. |
| 7,970,167 B2 | 6/2011 | Rhoads |
| 8,107,571 B2 | 1/2012 | Sullivan et al. |
| 9,078,008 B2 | 7/2015 | Ye et al. |
| 2002/0003906 A1 | 1/2002 | Zeng et al. |
| 2006/0008003 A1 | 1/2006 | Ji et al. |
| 2006/0114993 A1 | 6/2006 | Xiong et al. |
| 2007/0171969 A1 | 7/2007 | Han et al. |
| 2007/0217502 A1* | 9/2007 | Ammar ................ H04N 19/147 375/240.1 |
| 2007/0223582 A1 | 9/2007 | Borer |
| 2008/0089423 A1 | 4/2008 | Karczewicz |
| 2009/0008247 A1 | 1/2009 | Chen et al. |
| 2009/0175333 A1* | 7/2009 | Hsiang ................... H04N 19/63 375/240.12 |
| 2010/0027686 A1* | 2/2010 | Zuo ............................ G06T 9/00 375/240.29 |
| 2010/0046612 A1 | 2/2010 | Sun et al. |
| 2010/0220796 A1* | 9/2010 | Yin ....................... H04N 19/159 375/240.29 |
| 2010/0260260 A1* | 10/2010 | Wiegand ................ H04N 19/30 375/240.12 |
| 2011/0090959 A1* | 4/2011 | Wiegand .............. H04N 19/593 375/240.12 |
| 2012/0027079 A1 | 2/2012 | Ye et al. |
| 2012/0105681 A1* | 5/2012 | Morales ..................... G06T 5/50 348/239 |
| 2013/0027079 A1* | 1/2013 | Nazarian ............... H01L 27/101 326/41 |
| 2013/0121416 A1* | 5/2013 | He ....................... H04N 19/597 375/240.14 |
| 2013/0251051 A1 | 9/2013 | Ikai |
| 2013/0301702 A1 | 11/2013 | Minoo et al. |
| 2014/0003495 A1 | 1/2014 | Chuang et al. |
| 2014/0044161 A1 | 2/2014 | Chen et al. |
| 2014/0072033 A1 | 3/2014 | Chuang et al. |
| 2014/0185665 A1* | 7/2014 | Pu ......................... H04N 19/117 375/240.02 |
| 2014/0219333 A1 | 8/2014 | Xu et al. |
| 2015/0103900 A1* | 4/2015 | Liu ........................ H04N 19/31 375/240.12 |
| 2015/0139325 A1 | 5/2015 | Chuang et al. |
| 2015/0195566 A1 | 7/2015 | Hinz et al. |
| 2015/0341661 A1* | 11/2015 | Alshina .................. H04N 19/30 375/240.12 |
| 2016/0014425 A1 | 1/2016 | Hinz et al. |

FOREIGN PATENT DOCUMENTS

| | | |
|---|---|---|
| TW | I357766 | 2/2012 |
| WO | 2012081609 | 6/2012 |
| WO | 2012167712 | 12/2012 |

OTHER PUBLICATIONS

Extended European Search Report for European Patent Application No. 14150101.5, issued Mar. 19, 2014.
Final Office Action for U.S. Appl. No. 13/856,212, notified on Dec. 16, 2015.
Final Rejection for Korean Patent Application No. 2014-0000823 dated Jul. 29, 2016, 6 pages.
Non-Final Office Action dated May 26, 2016, for U.S. Appl. No. 13/856,212.
Notice of Allowance for Japanese Patent Application No. 2014-000268, dated Jun. 21, 2016, no translation available.
Notice of Allowance for Taiwan Patent Application No. 103100052, issued on May 6, 2016; No translation available.
Notice of Allowance for U.S. Appl. No. 13/856,212, dated Nov. 7, 2016.
Office Action for Japanese Patent Application No. 2014-000268, issued on Dec. 22, 2015.
Office Action for Japanese Patent Application No. 2014-000268, dated Mar. 3, 2015.
Office Action for Korean Patent Application No. 2014-0000823, issued Jul. 20, 2015.
Office Action for Korean Patent Application No. 2014-0000823, dated Sep. 30, 2016.
Office Action for Korean Patent Application No. 2014-0000823, dated Jan. 28, 2016.
Office Action for Taiwan Patent Application No. 103100052, dated Nov. 20, 2015.
Office Action for U.S. Appl. No. 13/856,212, notified on Aug. 20, 2015.
Chen, et al., "Description of Tool Experiment B4: Inter-layer Filtering", JCTVC-K1104, ITU-T SG16 WP3 and ISO/IEC JTC1/SC29/WG11, Oct. 10-19, 2012, pp. 1-11.
Chiu, Y. et al., "Description of Scalable Video Coding Technology Proposal by Intel", JCT-VC of ITU-T and ISO/IEC., JCTVC-K0039., Oct. 1, 2012, pp. 1-23.
Kim, et al., "Description of Scalable Video Coding Technology Proposal by LG Electronics and Media Tek (differential coding mode on)", JCTVC-K0033, ITU-T SG16 WP3 and ISO/IEC JTC1/SC29/WG11, Oct. 10-19, 2012., pp. 1-38.
McCann, et al., "Description of High Efficiency Scalable Video Coding Technology Proposal by Samsung and Vidyo", JCTVC-K0044, ITU-T SG16 WP3 and ISO/IEC JTC1/SC29/WG11, Oct. 10-19, 2012., pp. 1-31.
Ohm, Jens-Rainer , "Advances in Scalable Video Coding", Proceedings of the IEEE, vol. 93, Issue: 1, Jan. 2005.
Segall, C. A. et al., "Spatial Scalability within the H.264/AVC Scalable Video Coding Extension", IEEE Transactions on Circuits and Systems for Video Technology, vol. 17, Issue: 9, Sep. 2007.
Yamamoto, et al., "Description of Scalable Video Coding Technology Proposal by Sharp (proposal 2)", JCTVC-K0032, ITU-T SG16 WP3 and ISO/IEC JTC1/SC29/WG11, Oct. 10-19, 2012., pp. 1-17.
Zhang, Rong , "Efficient Inter-layer Motion Compensation for Spatially Scalable Video Coding", IEEE Transactions on Circuits and Systems for Video Technology, vol. 18, Issue: 10, Oct. 2008.

(56) References Cited

OTHER PUBLICATIONS

Office Action for European Patent Application No. 14150101.5, dated Mar. 26, 2018.

* cited by examiner

700
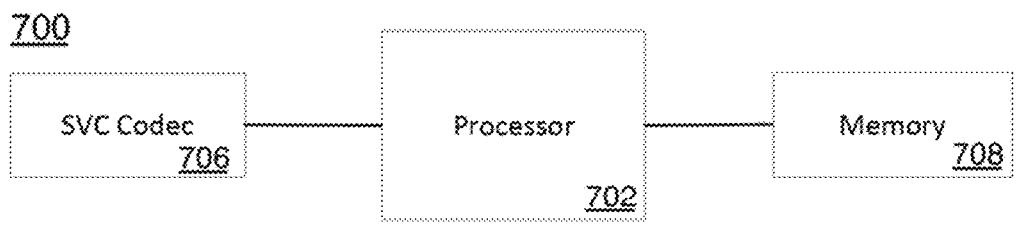
FIG. 7
800
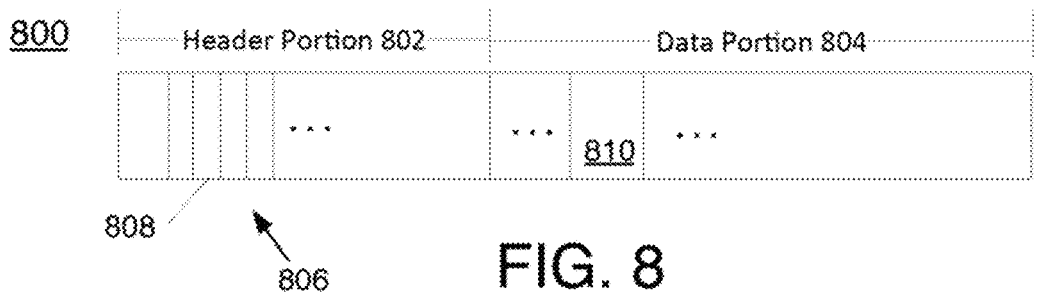
FIG. 8
900
Apply A Fixed Refining Filter To Reconstructed Reference Layer Video Data To Generate Refined Reconstructed Video Data
902
Perform Inter Layer Prediction For An Enhancement Layer Associated With The Video Data Based At Least In Part On The Refined Reconstructed Video Data
904
FIG. 9

REFINING FILTER FOR INTER LAYER PREDICTION OF SCALABLE VIDEO CODING

CLAIM FOR PRIORITY

The present application is a continuation of U.S. patent application Ser. No. 13/856,212, filed on Apr. 3, 2013 and titled "REFINING FILTER FOR INTER LAYER PREDICTION OF SCALABLE VIDEO CODING", which claims the benefit of U.S. Provisional Application No. 61/749,000, filed on Jan. 4, 2013 and titled "REFINING FILTER FOR INTER LAYER PREDICTION OF SCALABLE VIDEO CODING", both of which are incorporated by reference in their entireties.

BACKGROUND

A video encoder compresses video information so that more information can be sent over a given bandwidth. The compressed signal may then be transmitted to a receiver having a decoder that decodes or decompresses the signal prior to display.

High Efficiency Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). Similar to previous video coding standards, HEVC includes basic functional modules such as intra/inter prediction, transform, quantization, in-loop filtering, and entropy coding.

As the standardization of the main part of HEVC is reaching completion, the study of Scalable Video Coding (SVC) extension of HEVC has begun. SVC is a solution to cope with the heterogeneity of networks and devices in modern video service environments. An HEVC SVC bitstream contains several sub-bitstreams that can themselves be decoded, and these sub-bitstreams represent the source video content with different resolution, frame rate, quality/SNR, bit depth, and so forth. To achieve the various scalabilities, a multi-layered coding structure is often used. In general, multi-layered coding structure has one Base Layer (BL) and one or more Enhancement Layers (ELs). This structure permits a picture, or portions of a picture, belonging to an EL to be predicted from lower layer pictures (e.g., a BL picture or a lower level EL picture) or from previously coded pictures in the same layer.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 7 is an illustrative diagram of an example system;

FIG. 8 is an illustrative diagram of an example bit stream;

FIG. 9 is a flow chart illustrating an example video coding process;

DETAILED DESCRIPTION

Figure 1:
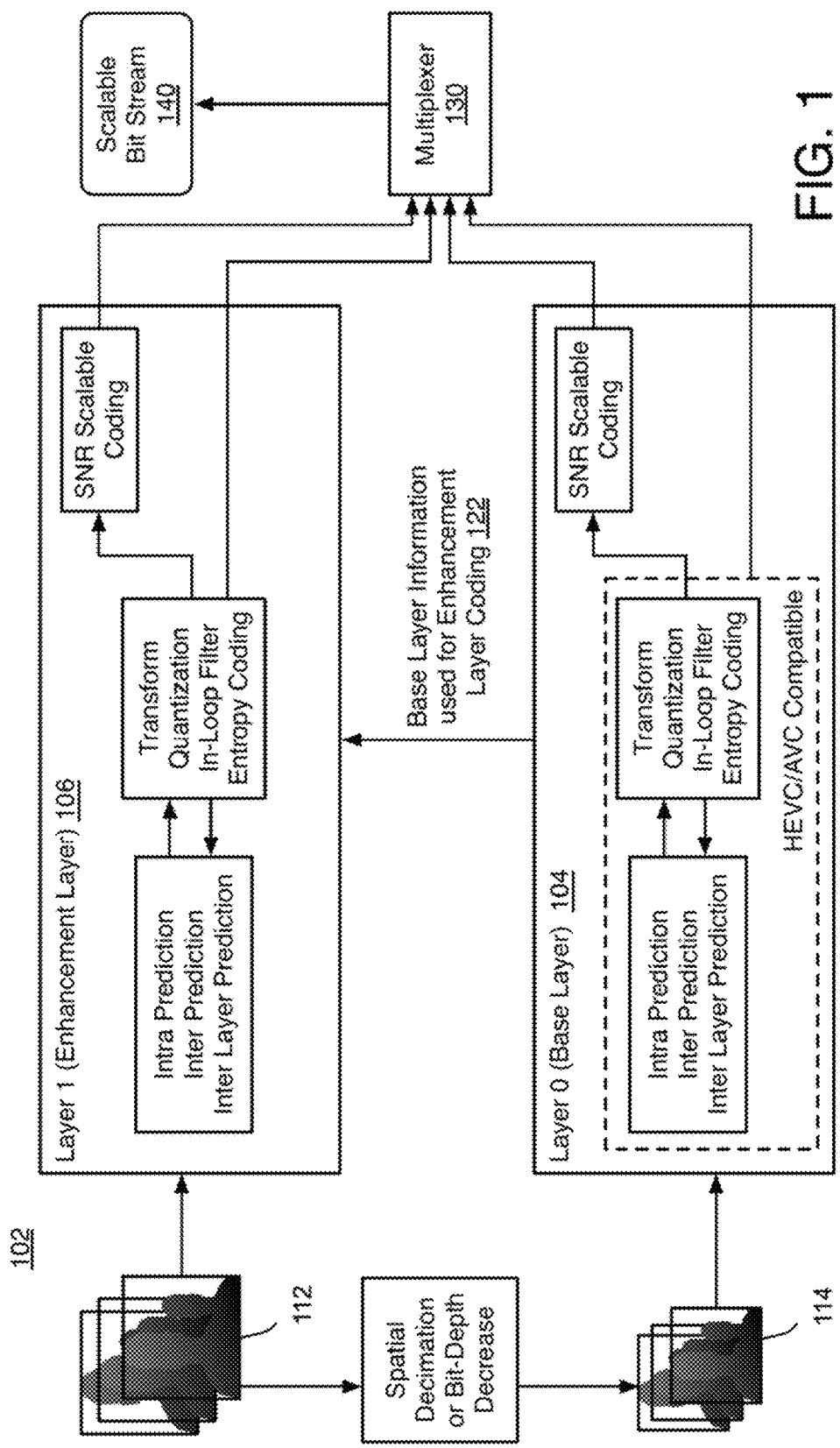
FIG. 1 is an illustrative diagram of an example encoder with one base layer and one enhancement layer.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Scalable video coding systems, apparatus, articles, and methods are described below. In scalable video coding systems, multi-layered coding is used to support several kinds of scalability including spatial scalability, temporal scalability, quality scalability, bit-depth scalability and so forth. In accordance with the present disclosure, various refining filter or filters may be used to increase scalable video coding efficiency and/or flexibility in scalable video coding systems. In various implementations refining filter or filters may be employed by one or more of a video codec, a video encoder, a video processor, a media processor, or the like to enable, for example, inter layer prediction in scalable video coding.

Systems, apparatus, articles, and methods are described below related to video coding including a refining filter or filters for inter layer prediction of scalable video coding.

As described above, High Efficiency Video Coding (HEVC) is expected to include a Scalable Video Coding (SVC) extension. An HECV SVC bit stream may include several subset bit streams representing the source video content at different spatial resolutions, frame rates, qualities, bit depths, and so forth. Scalability may then be achieved using a multi-layer coding structure that, in general, includes a base layer (BL) and at least one enhancement layer (EL), which may permit a picture, or portions of a picture to be predicted from lower layer pictures (e.g., a BL picture) or from previously coded pictures in the same layer. Such techniques may cope with the heterogeneity of networks and devices in modern video service environments. For example, a SVC bit stream may contain several subset bit streams that may themselves be decoded such that the sub-streams may represent the source video content with different resolutions, frame rates, qualities, bit depths, and so forth. In various network and device scenarios, therefore, different video qualities may be achieved based on bandwidth or device constraints, for example.

As will be described in greater detail below, a fixed refining filter may be applied to reconstructed reference layer video data (e.g., a picture associated with a base layer or a lower level enhancement layer) to generate refined reconstructed video data. Based on, or based in part on, the refined reconstructed video data, inter layer prediction may be performed for an enhancement layer associated with the video data. In some examples, the fixed refining filter may be applied and the inter layer predication may be performed at an encoder and a bit stream may be encoded based in part on the inter layer predication at the enhancement layer. In other examples, the fixed refining filter may be applied and the inter layer predication may be performed at a decoder and enhancement layer output video may be generated based in part on the inter layer predication at the enhancement layer for presentment via a display device, for example.

As used herein, the term "coder" may refer to an encoder and/or a decoder. Similarly, as used herein, the term "coding" may refer to performing video encoding via an encoder and/or performing video decoding via a decoder. For example a video encoder and video decoder may both be examples of coders capable of coding video data. In addition, as used herein, the term "codec" may refer to any process, program or set of operations, such as, for example, any combination of software, firmware, and/or hardware, that may implement an encoder and/or a decoder. Further, as used herein, the phrase "video data" may refer to any type of data associated with video coding such as, for example, video frames, image data, encoded bit stream data, or the like.

Embodiments apply to the problem of Scalable Video Coding (SVC) to be considered as the potential technology to be standardized in the international video codec committees. As discussed, an SVC bitstream may contain one base layer sub-bitstream and at least one enhancement layer sub-bitstream. In general, the base layer bitstream may be decoded independently to reconstruct a base layer video. However, the enhancement layer bitstream cannot be decoded independently because the enhancement layer frames may be predicted from the reconstructed video of lower layer, which is called inter layer prediction, or via previous enhancement layer frames. As is discussed further herein, the lower layer may be the base layer or lower level enhancement layer.

Therefore, an enhancement layer bitstream may be encoded/decoded together with the lower layer reconstructed video to construct the output video for the enhancement layer. In a previous design of inter layer prediction, an enhancement layer frame may be directly predicted from the processed lower layer reconstructed frame. Such processing of lower layer reconstruction may include, for example, frame up-sampling for spatial scalability, tone mapping for bit-depth scalability, or passing through without any processing. Further, a previous technique may apply an adaptive Wiener filter (with offsets) for inter layer prediction of scalable video coding. As will be described in greater detail below, embodiments herein apply fixed refining filter or filters to improve the efficiency of inter layer prediction. Such techniques may increase compression performance of an SVC system, for example, and reduce the computational complexity of the codec implementation.

As described above, SVC is a solution to cope with the heterogeneity of networks and devices in modern video service environment. A SVC bitstream contains several sub-bitstreams that can themselves be decoded, and these sub-bitstreams represent the source video content with different resolution, frame rate, quality/SNR, bit depth, and so forth. To achieve the various scalabilities, multi-layered coding structure is often used. In general, there may be one Base Layer (BL) and several Enhancement Layers (ELs) in a SVC system.

FIG. 1 is an illustrative diagram of an example SVC encoder 102 with one base layer and one enhancement layer, arranged in accordance with at least some implementations of the present disclosure. As shown, encoder 102 may include one base layer, layer 0 (base layer) 104 and one enhancement layer, layer 1 (enhancement layer) 106. A base layer picture may be independently encoded/decoded to construct/reconstruct the base layer video. When an enhancement layer picture is encoded/decoded, it may be predicted from lower layer pictures or previously encoded/decoded pictures in the same layer. Therefore, when coding an enhancement layer with layer ID equal to N, it is guaranteed that all the layers with layer ID less than N should be available. For example, when coding enhancement layer 106, it is guaranteed that base layer 104 will be available.

As shown, enhancement layer 106 may receive enhancement layer input frames 112 and base layer 104 may receive base layer input frames 114. Further, as shown, base layer input frames 114 may have a scalability relative to enhancement layer input frames 112 such that they are decimated in some way, such as for example, spatially or via a bit depth decrease, or the like. In general, the scalability between enhancement layer input frames 112 and base layer input frames 114 may be spatial scalability, quality/SNR scalability, bit-depth scalability or other scalabilities.

As discussed, base layer input frames 114 may be encoded at base layer 104 via a HEVC/AVC compatible coding technique that may employ intra prediction, inter prediction, and/or interlay prediction. Further, base layer 104 may employ transform, quantization, in-loop filtering, entropy coding, and/or SNR scalable coding techniques to generate output bit streams. Similarly, enhancement layer input frames 112 may be processed via enhancement layer 106 to generate output bit streams. The output bit streams from base layer 104 and enhancement layer 106 may be multiplexed via multiplexer 130 to generate a scalable bit stream 140.

As shown, base layer 104 may transfer base layer information used for enhancement layer coding 122 to enhancement layer 106 for use in coding enhancement layer input frames 112. As is discussed in greater detail below, base layer information used for enhancement layer coding 122 may contain or be processed to contain refined reconstructed video data by applying one or more fixed refining filters (via fixed refining filtering) to reconstructed video data generated by base layer 104.

Figure 2:
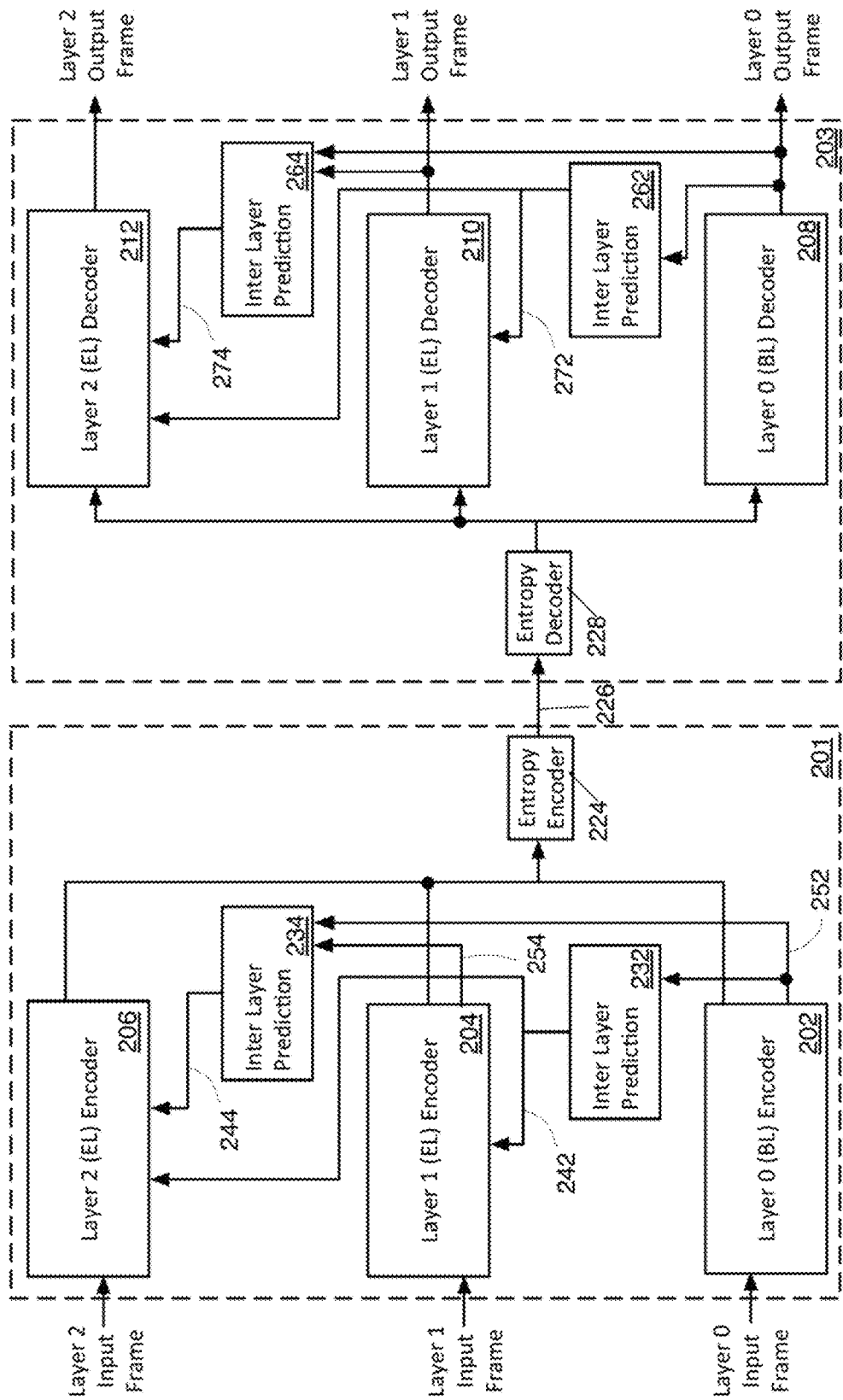
FIG. 2 illustrates an example scalable video coding system.

FIG. 2 illustrates an example scalable video coding (SVC) coding system 200, arranged in accordance with at least some implementations of the present disclosure. In general, system 200 may provide a computer implemented method for performing scalable video coding. In various implementations, system 200 may undertake video compression and decompression and/or implement video codecs according to one or more standards or specifications, such as, for example, the High Efficiency Video Coding (HEVC) standard (see ISO/IEC JTC/SC29/WG11 and ITU-T SG16 WP3, "High efficiency video coding (HEVC) text specification draft 8" (JCTVC-J1003_d7), July 2012) and any Scalable Video Coding (SVC) extension of thereof. Although system 200 and/or other systems, schemes or processes may be described herein in the context of an SVC extension of the HEVC standard, the present disclosure is not limited to any particular video encoding standard or specification or extensions thereof.

As illustrated, system 200 may include an encoder subsystem 201 that may have multiple video encoders including a Layer 0 or base layer (BL) encoder 202, a Layer 1 or first enhancement layer (EL) encoder 204, and a Layer 2 or second EL encoder 206. System 200 may also include corresponding video decoders of a decoder subsystem 203 including a Layer 0 (BL) decoder 208, a Layer 1 (EL) decoder 210, and a Layer 2 (EL) decoder 212. In general, the BL may be HEVC compatible coded. As discussed, when coding an EL with a layer identification (ID) equal to N, for example, SVC coding schemes provide all coding layers having a layer ID less than N for use in inter layer prediction schemes so that a picture belonging to a particular EL may be predicted from lower layer pictures (e.g., in a BL or one or more lower layer ELs) or from previously coded pictures in the same EL.

In accordance with the present disclosure, as will be explained in greater detail below, either or both of EL encoders 204 and 206 may use refined reconstructed video data generated via one or more of inter layer prediction module 232 and/or inter layer prediction module 234 to perform inter layer prediction. For example, in some implementations, encoder 204 may perform inter layer prediction using, at least in part, refined reconstructed video data 242 obtained from inter layer prediction module 232. In addition, in some implementations, encoder 206 may perform inter layer prediction using, at least in part, reconstructed video data 242 and/or reconstructed video data 244 obtained, respectively, from inter layer prediction module 232 and/or inter layer prediction module 234. As is discussed further herein, inter layer prediction module 232 may include a lower layer processing module and a refining filtering module and may generate reconstructed video data 242 based at least in part on reconstructed base layer video data 252. Further, inter layer prediction module 234 may include a lower layer processing module and a refining filtering module and may generate reconstructed video data 244 based at least in part on reconstructed base layer video data 252 and/or reconstructed base layer video data 254.

As discussed, an EL may use reconstructed reference layer video data to perform inter layer prediction. Also as discussed, the reconstructed reference layer video data may be received at the EL from a BL or a lower level EL (or both). As used herein the term "reference layer" (RL) refers to either a BL or an EL that may provide the reconstructed reference layer video data to the EL receiving and using the reconstructed reference layer video data to perform inter layer prediction. In general, the EL receiving and using the reconstructed reference layer video data to perform inter layer prediction may be considered a "target EL" or simply an EL.

Employing any one or more of encoders 202, 204 and 206, encoder subsystem 201 may provide separate bit streams to an entropy encoder 224. Entropy encoder 224 may then provide a compressed bit stream 226, including multiple layers of scalable video content, to an entropy decoder 228 of decoder subsystem 203. In accordance with the present disclosure, as will also be explained in greater detail below, either or both of EL decoders 210 and 212 may use refined reconstructed video data 272 or refined reconstructed video data 274 (or both) obtained from either inter layer prediction module 262 or inter layer prediction module 264, respectively, to perform inter layer prediction when decoding video data. For example, in some implementations, decoder 210 may perform inter layer prediction using refined reconstructed video data 272 received from inter layer prediction module 262. In addition, in some implementations, decoder 212 may perform inter layer prediction using refined reconstructed video data 272 and/or refined reconstructed video data 274 obtained, respectively, from either or both of inter layer prediction module 262 and/or inter layer prediction module 264.

While FIG. 2 illustrates system 200 as employing three layers of scalable video content and corresponding sets of three encoders in subsystem 201 (and two inter layer prediction modules) and three decoders in subsystem 203 (and two inter layer prediction modules), any number of scalable video coding layers and corresponding encoders, decoders, and inter layer prediction modules may be utilized in accordance with the present disclosure. Further, the present disclosure is not limited to the particular components illustrated in FIG. 2 and/or to the manner in which the various components of system 200 are arranged.

Further, it may be recognized that encoder subsystem 201 may be associated with and/or provided by a content provider system including, for example, a video content server system, and that bit stream 226 may be transmitted or conveyed to decoder subsystem 203 by various communications components and/or systems such as transceivers, antennae, network systems and the like not depicted in FIG. 2. It may also be recognized that decoder subsystem 203 may be associated with a client system such as a computing device (e.g., a desktop computer, laptop computer, tablet computer, mobile phone or the like) that receives bit stream 226 via various communications components and/or systems such as transceivers, antennae, network systems and the like not depicted in FIG. 2. Therefore, in various implementations, encoder subsystem 201 and decoder subsystem 203 may be implemented either together or independent of one another. Further, while systems, apparatus and methods described herein may refer to performing inter layer prediction for a picture, the present disclosure is not limited in this regard and inter layer prediction may be performed for any partition of video data picture including, for example, for a sequence, a layer, a picture, a slice, or a block of video data.

Figure 3:
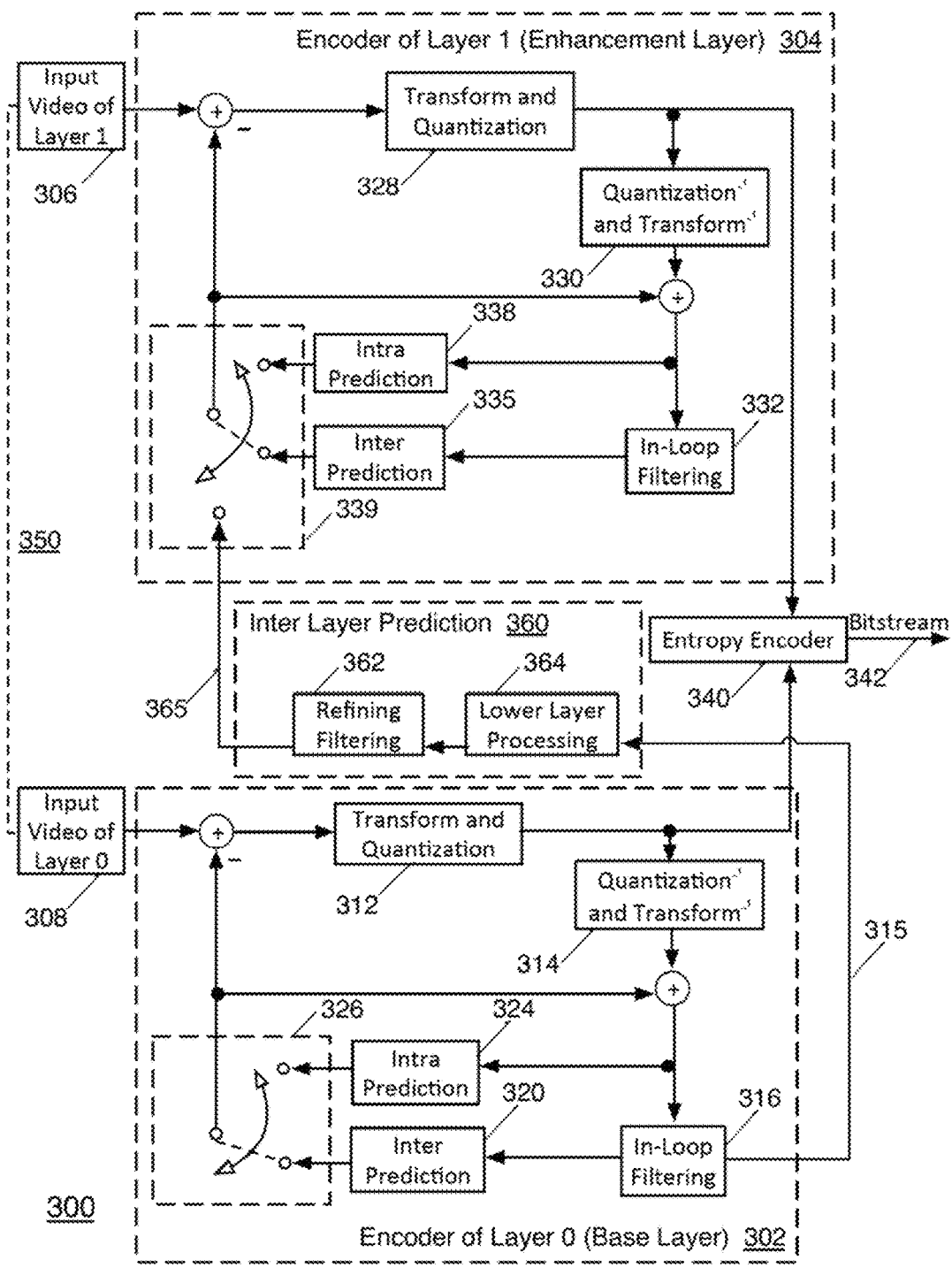
FIG. 3 is an illustrative diagram of an example SVC encoding system.
Figure 4:
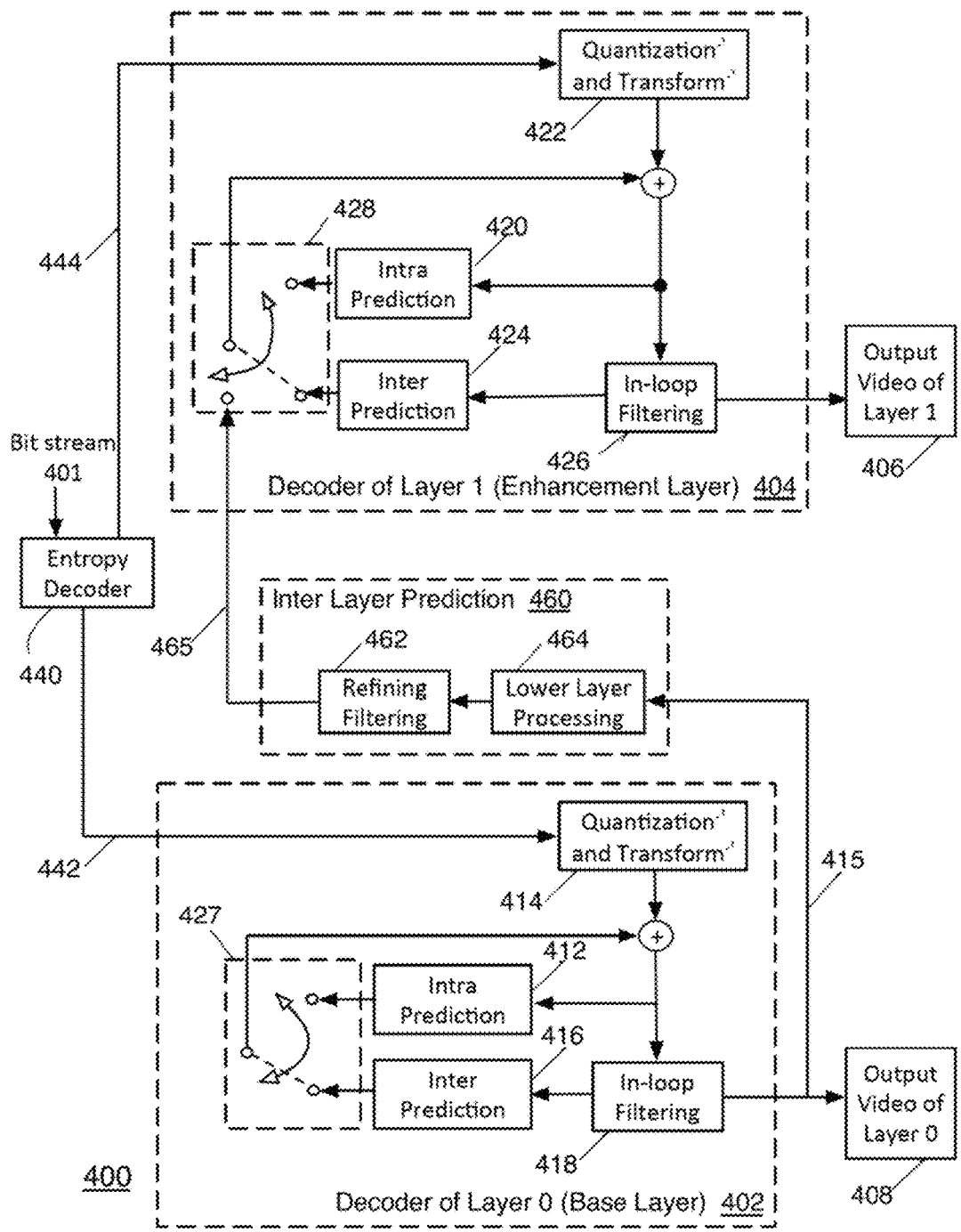
FIG. 4 is an illustrative diagram of an example SVC decoding system.

FIGS. 3 and 4 are an illustrative diagram of an example of SVC codec or coding system, arranged in accordance with at least some implementations of the present disclosure. For example, FIG. 3 illustrates an example SVC encoding system 300 and FIG. 4 illustrates an example SVC decoding system 400.

As shown in FIG. 3, system 300 may include a base layer encoder 302 and an enhancement layer encoder 304 that may correspond, in an example, to encoder 202 and encoder 204, respectively, of system 200. While system 300 may include only two encoders 302 and 304 corresponding to two SVC coding layers, such as, for example, a base layer encoder and an enhancement layer encoder, any number of SVC coding layers and corresponding encoders may be utilized in accordance with the present disclosure in addition to those depicted in FIG. 3. For example, additional encoders corresponding to additional enhancement layers may be included in system 300 and may interact with encoder 302 in a similar manner to that to be described below with respect to encoder 304. For example, although described with respect to base layer encoder 302 and enhancement layer encoder 304 for the sake of clarity of presentation, system 300 may include any reference layer encoder and enhancement layer encoder associated with a reference layer and enhancement layer as discussed herein. In general, a reference layer encoder may be an encoder for a base layer (as shown) or for any enhancement layer at a lower level than the enhancement layer associated with enhancement layer encoder 304.

As shown, base layer encoder 302 may receive base layer input video 308 and enhancement layer encoder 304 may receive enhancement layer input video 306. In general, base layer input video 308 may be associated with a base layer of video data 350 and enhancement layer input video 306 may be associated with an enhancement layer of video data 350 (such as a target enhancement layer). In other examples, video data 350 may include a reference layer (e.g., a lower level enhancement layer) and an enhancement layer (e.g., a target enhancement layer) as discussed. Further, as discussed, base layer input video 308 may have a scalability relative to enhancement layer input video 306 such that the base layer may be decimated in some way, such as for example, spatially, by quality, by a bit depth decrease, or the like.

As shown, system 300 also includes inter layer prediction module 360 having a refining filtering module 362 and optional lower layer processing module 364. In general, inter layer prediction module 360 may be implemented as a separate module of system 300 (as shown), as a portion of enhancement layer encoder 304, or as a portion of base layer encoder 302, or the like. As is discussed further herein, lower layer processing module 364 may apply lower layer processing to reconstructed base layer video data 315. In various examples, the lower layer processing may include up-sampling for spatial scalability or tone mapping for bit-depth scalability or the like. As discussed, in some examples, no lower layer processing may be applied. Refining filtering module 362 may apply a fixed refining filter to reconstructed base layer video data 315 (either with or without lower layer processing) to generate refined reconstructed video data 365. Enhancement layer encoder 304 may performing inter layer prediction based at least in part on refined reconstructed video data 365 and, as is discussed further herein, system 300 may encode a bit stream 342 based at least in part on the inter layer prediction at enhancement layer encoder 304.

When employing system 300 to undertake SVC coding, at least some blocks of enhancement layer input video 306 may be predicted by enhancement layer encoder 304 from one or more pictures of base layer input video 308 as processed by base layer encoder 302 or from other video data (e.g., pictures) in the same enhancement layer that were previously encoded by enhancement layer encoder 304. As will be described in greater detail below, when undertaking inter layer prediction operations using system 300, one or more pictures of enhancement layer input frame 306 may be inter layer predicted using, at least in part, pictures of refined reconstructed video data 365 as provided by inter layer prediction module 360 and, in particular, refining filtering module 362. Although discussed with respect to the picture level, the use of refined reconstructed video data to perform enhancement layer inter layer prediction as described herein may be applied at a sequence, a layer, a picture, a slice, or a block level, for example.

In general, reconstructed base layer video data 315 may be determined based on the processing of base layer input video 308 using a coding loop that may include a transform and quantization module 312, an inverse quantization and inverse transform module 314, an in-loop filtering module 316, an inter prediction module 320, an intra prediction module 322, and/or a mode decision module 326, or the like. As shown in FIG. 3, reconstructed base layer video data 315 may be obtained from in-loop filtering module 316. The functionality of modules 312, 314, 316, 320, 324, and 326 are well recognized in the art and will not be described in any greater detail herein.

As shown, at enhancement layer encoder 304, refined reconstructed video data 365 may be received at a mode decision module 339, for example, and may be used, at least in part, to perform inter layer prediction for pictures or blocks or the like of blocks of enhancement layer input frame 306 using a coding loop that may include a transform and quantization module 328, an inverse quantization and inverse transform module 330, an in-loop filtering module 332, an intra prediction module 338, a inter prediction module 335, and/or mode decision module 339, or the like. The functionality of modules 328, 330, 332, 338 and 335 are well recognized in the art and will not be described in any greater detail herein. As shown, mode decision module 339 may be configured to implement a mode decision between the output of intra prediction module 338, inter prediction module 335, and refined reconstructed video data 365, as discussed herein. As shown, in accordance with the present disclosure, enhancement layer encoder 304 may use refined reconstructed video data 365 to perform inter layer prediction for pictures or blocks or he like of enhancement layer input video 306. For example, enhancement layer encoder 304 may use enhancement layer input video 306 to perform inter layer prediction for pictures or blocks or the like of enhancement layer input video 306. As will be appreciated, the inter layer compensation may be performed for any number of blocks or pictures or the like of an number of frames or other input data of enhancement layer input video 306.

In various implementations either or both of base layer encoder 302 and enhancement layer encoder 304 may provide compressed coefficients corresponding to coded residuals of at least some of base layer input video 308 and of at least some of enhancement layer input video 306, respectively, to an entropy encoder module 340. Entropy encoder module 340 may perform lossless compression (e.g., via Context-adaptive binary arithmetic coding (CABAC)) of the residuals and provide a multiplexed SVC bit stream 342 including the encoded residuals as output from system 300. Further, as will be described in greater detail below, bit stream 342 may include an indicator, such as a flag, that specifies whether or not to apply fixed refining filtering as discussed. As will be described in greater detail below, depending on the value of such an indicator, a decoding system may or may not perform inter layer prediction using refined reconstructed video data received from a inter layer prediction module as discussed. Further, and as will also be described in greater detail below, bit stream 342 may include a fixed refining filter indicator configured to indicate which fixed refining filter of multiple fixed refining filters to apply. Depending on the value of such a fixed refining filter indicator, a decoding system may apply a fixed refining filter of multiple fixed refining filters.

Turning now to FIG. 4, system 400 may includes a base layer decoder 402 and a target enhancement layer decoder 404 that may correspond, for example, to decoder 208 and decoder 210, respectively, of system 200. While system 400 includes only two decoders 402 and 404 corresponding to two SVC coding layers, any number of SVC coding layers and corresponding decoders may be utilized in accordance with the present disclosure in addition to those depicted in FIG. 4. For example, additional decoders corresponding to additional enhancement layers may be included in system 400 and may interact with the base layer decoder 402 in a similar manner to that to be described below with respect to enhancement layer decoder 404. For example, although described with respect to base layer decoder 402 and enhancement layer decoder 404 for the sake of clarity of presentation, system 400 may include any reference layer decoder and enhancement layer decoder associated with a reference layer and enhancement layer as discussed herein. In general, a reference layer decoder may be a decoder for a base layer (as shown) or for any enhancement layer at a lower level than the enhancement layer associated with enhancement layer decoder 404.

When employing system 400 to undertake SVC coding, various pictures or blocks or the like in enhancement layer output video 406 (e.g., an enhancement layer output frame) may be inter layer predicted by enhancement layer decoder 404 from pictures or blocks or the like of base layer output video data 408 (e.g., a base layer output frame) as processed by base layer decoder 402 or from other pictures or blocks or the like in the same enhancement layer that were previously decoded by enhancement layer decoder 404. As will be described in greater detail below, such inter layer prediction of blocks in enhancement layer output frame 406 may employ refined reconstructed video data 465 provided by inter layer prediction module 460. Inter layer prediction module 460 may include a refining filtering module 462 and optional lower layer processing module 464. In general, inter layer prediction module 460 may be implemented as a separate module of system 400 (as shown), as a portion of enhancement layer encoder 404, or as a portion of base layer encoder 402, or the like. Lower layer processing module 464 may apply lower layer processing to reconstructed base layer video data 415. In various examples, the lower layer processing may include up-sampling for spatial scalability or tone mapping for bit-depth scalability or the like. As discussed, in some examples, no lower layer processing may be applied. Refining filtering module 462 may apply a fixed refining filter to reconstructed base layer video data 415 (either with or without lower layer processing) to generate refined reconstructed video data 465.

As shown, system 400 may include an entropy decoder 440 which may receive and decode an encoded bit stream 401 to provide base layer video data 442 to base layer decoder 402 and enhancement layer video data 444 to enhancement layer decoder 404. Also as shown, base layer decoder 402 may include an inverse quantization and inverse transform and module 414, an intra prediction module 412, an inter prediction module 416, an in-loop filtering module 418, and/or a mode decision module 427. As shown in FIG. 4, reconstructed base layer video data 415 may be obtained from in-loop filtering module 418. The functionality of modules 412, 414, 416, 418, and 426 are well recognized in the art and will not be described in any greater detail herein.

As shown, refined reconstructed video data 465 may be provided to a syntax specification module 428 of enhancement layer decoder 404. Enhancement layer decoder 404 may also include an inverse quantization and inverse transform module 422, an intra prediction module 420, an inter prediction module 424, and/or an in-loop filtering module 426. When operated to undertake inter layer prediction, enhancement layer decoder 404 may employ refined reconstructed video data 465 to reconstruct pixel data for various blocks of enhancement layer output video 406 (e.g., enhancement layer output frames). Further, enhancement layer decoder 404 may do so based on the value of an indicator provided in bit stream 401 where bit stream 401 may correspond to bit stream 226 of FIG. 2, bit stream 342 of FIG. 3, or the like. For example, bit stream 401 may include an indicator, such as a flag, that specifies whether or not to apply fixed refining filtering as discussed. As will be described in greater detail below, depending on the value of such an indicator, a decoding system may or may not perform inter layer prediction using refined reconstructed video data received from a inter layer prediction module as discussed. Further, bit stream 401 may include a fixed refining filter indicator configured to indicate which fixed refining filter of multiple fixed refining filters to apply. Depending on the value of such a fixed refining filter indicator, system may 400 may apply a fixed refining filter of multiple fixed refining filters (via inter layer prediction module 460 and/or refining filtering module 462, for example). In some examples, the fixed refining filters may apply coefficients and offsets as is further discussed below. The applied coefficients and/or offsets may be particular to a fixed refining filter such that choosing which fixed refining filter to apply may select the coefficients and/or offsets to be applied.

As discussed, an inter layer prediction module (via a refining filtering module, for example) may apply a fixed refining filter to reconstructed reference layer video data to generate refined reconstructed video data. The refined reconstructed video data may be used to perform inter layer prediction for an enhancement layer associated with the video data (via an enhancement layer encoder or decoder, for example). Also as discussed, base layer and enhancement layer video data may differ by a relative scalability such as a spatial scalability, quality/SNR scalability, bit-depth scalability or other scalabilities. Further, lower layer processing may be applied to reconstructed reference layer video data prior to applying the fixed refining filter. In general, the behavior of lower layer processing may be dependent on the scalability. For example, up-sampling may be applied for spatial scalability, tone mapping may be applied for bit-depth scalability, or, in some examples, the reconstructed reference layer video data may be passed through without any processing. In general, the applied fixed refining filter, may be applied on the processed lower layer reconstructed picture to improve the accuracy of the inter layer prediction. The compression efficiency of EL coding may be increased by using this improved inter layer prediction.

Figure 5:
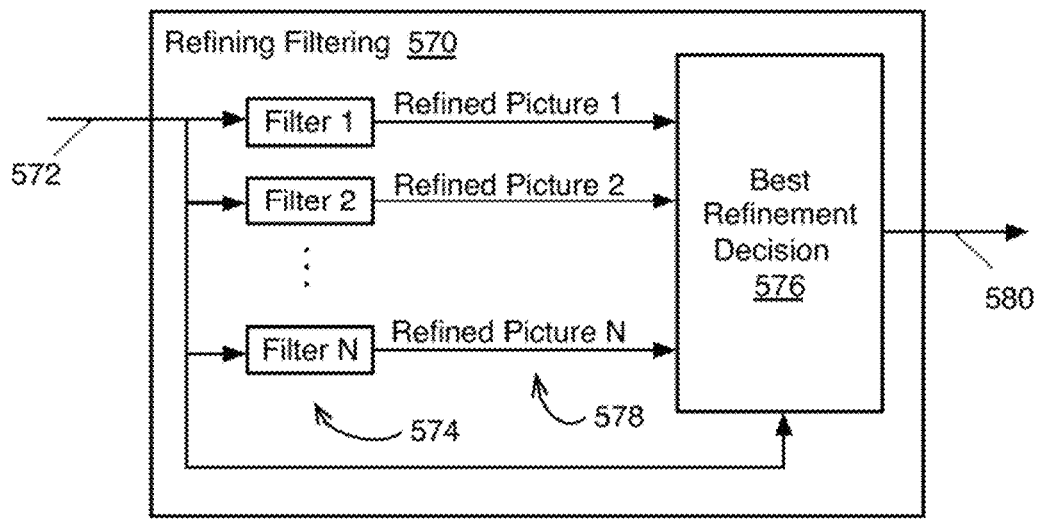
FIG. 5 is an illustrative diagram of an example of fixed refining filtering.

In some examples, applying the fixed refining filter may include employing a single fixed refining filter. In other examples, applying the fixed refining filter may include employing multiple fixed refining filters. And in some examples, a set of fixed filters may be used to refine the inter layer prediction. FIG. 5 is an illustrative diagram of an example fixed refining filtering, arranged in accordance with at least some implementations of the present disclosure. FIG. 5 also illustrates a refining filtering procedure, arranged in accordance with at least some implementations of the present disclosure. As shown, reconstructed reference layer video data 572 may be received at refining filtering module 570. In general, refining filtering module 570 may correspond to refining filtering module 362 or refining filtering module 462, or the like, and, in general, refining filtering module 570 may be implemented via an encoder or a decoder as discussed herein. As discussed, reconstructed reference layer video data 572 may be pre-processed by a lower layer processing module (e.g., module 364 or 464 or the like) or no pro-processing may be performed. In examples where pre-processing is employed, reconstructed reference layer video data 572 may be considered a processed lower layer reconstructed pre-filtering picture or block or the like. As shown, reconstructed reference layer video data 572 may be filtered by one or more fixed filters 574 to generate one or more refined pictures 578.

As discussed, in some examples, a single fixed filter 574 may be employed to generate a single refined picture 578. In such examples, best refinement decision module 576 may be eliminated and the single refined picture 578 may be transferred as refined reconstructed video data 580.

In some examples where multiple fixed filters 574 are employed, only a single refined picture may be generated. For example, a single fixed filter of the multiple fixed filters may be chosen and only the chosen fixed filter may generate a refined picture, which may be transferred as refined reconstructed video data 580 (which may correspond to refined reconstructed video data 365, 465, or the like). For example, when employed via a decoder, as is discussed further below, a received bit stream may include a fixed refining filter indicator that indicates which fixed refining filter of the multiple fixed refining filters to apply. In other implementations (either at an encoder or a decoder), best refinement decision module 576 may be employed to determine a single fixed filter of the multiple fixed filters to employ. For example, best refinement decision module 576 may receive and evaluate reconstructed reference layer video data 572 to determine which fixed filter to apply. The evaluation of reconstructed reference layer video data 572 may based, at least in part, on a local adaptive method, evaluating local edge information of reconstructed reference layer video data 572, evaluating a gradient strength of reconstructed reference layer video data 572, or evaluating a local variance of reconstructed reference layer video data 572, or the like. In general, the discussed edge information, gradient strength, local variance or other measurements may be used separately in the evaluation of reconstructed reference layer video data 572. Examples of such techniques are described further below.

In further examples, multiple fixed filters 574 may each generate an associated refined picture of refined pictures 578 and best refinement decision module 576 may evaluate refined pictures 578 to determine a chosen refined picture, which may be transferred as refined reconstructed video data 580. The determination may be made based on any suitable comparison of refined pictures 578 such as, for example, a comparison of refined pictures 578 to a picture of reconstructed reference layer video data 572. Although discussed with respect to a picture level, as discussed herein, refining filtering module 570 and other modules discussed herein may be implemented at any image level including a picture, a slice or a block level, or the like.

In general, fixed filters 574 may include any suitable fixed filter that may generate refined reconstructed video data from reconstructed reference layer video data as discussed herein. For example, letting P(x, y) denote the pixel value of a pre-filtering picture (e.g., associated with reconstructed reference layer video data 572) at the position (x, y), the refining filtering (e.g., a fixed filer of multiple fixed filters 574) may be performed on P(x, y) as shown in Equation (1):

$$P'_i(x, y) = \sum_{m=M_0}^{M_1} \sum_{n=N_0}^{N_1} P(x+m, y+n) \cdot C_i(m, n) + O_i \quad (1)$$

where $C_i$ and $O_i$ may denote the filter coefficients and offset value of the $i^{th}$ fixed filter, $M_0$, $M_1$, $N_0$ and $N_1$ are parameters that may define a filter window, and P' may represent a refined picture (e.g., refined reconstructed video data). In general, with different setting of $M_0$, $M_1$, $N_0$ and $N_1$, the filter may be symmetric or asymmetric, one-dimensional or two-dimensional. As discussed, after such processing, best refinement decision module 576 may determine the optimal refined results (e.g., the optimal result from refined pictures 578). Therefore, in some examples, applying a fixed refining filter may include taking the dot product of the reconstructed reference layer video data (e.g., pixel data) and filter coefficients and adding offset values (e.g., as shown in Equation (1)). In some examples, applying the fixed refining filter may include applying the fixed refining filter to a filter window of the reconstructed reference layer video data. In other examples, applying the fixed refining filter may include applying the fixed refining filter to the entirety of the reconstructed reference layer video data.

As discussed, FIG. 5 illustrates example of fixed refining filters. In general, fixed refining filters may have their respective properties. For example, as discussed, the fixed refining filter (if only one is employed) or one or more of multiple fixed filters may include a symmetric fixed refining filter, an asymmetric fixed refining filter, a one-dimensional fixed refining filter, a separable two-dimensional fixed refining filter, or a non-separable two-dimensional fixed refining filter. Further, in various examples, the fixed filter (if only one is employed) or one or more of multiple fixed filters may be a spatial smoothing filter, a spatial sharpening filter, a particular histogram band enhancement filter, a particular histogram band pass filter, a low frequency enhancement filter, a high frequency enhancement filter, a particular frequency band enhancement filter, a high-pass frequency filter, a band-pass frequency filter, or a low-pass frequency filter, or some other filter.

In some examples, a low pass filter may provide a refined picture that is smoother than the reconstructed input picture. An example of low pass filter coefficients and offsets are shown in Equation (2) (with reference to Equation (1)):

$$\begin{cases} C_1(-1,0) = C_1(1,0) = C_1(0,1) = C_1(0,-1) = 1/16 \\ C_1(-1,-1) = C_1(-1,1) = C_1(1,1) = C_1(1,-1) = 1/16 \\ C_1(0,0) = 1/2 \\ O_1 = 0 \end{cases} \quad (2)$$

Another example of low pass filter coefficients and offsets are shown in Equation (3) (again with reference to Equation (1)):

$$\begin{cases} C_1(-2,0) = C_1(2,0) = C_1(0,2) = C_1(0,-2) = -1/16 \\ C_1(-1,0) = C_1(1,0) = C_1(0,1) = C_1(0,-1) = 1/8 \\ C_1(-1,-1) = C_1(-1,1) = C_1(1,1) = C_1(1,-1) = 1/16 \\ C_1(0,0) = 1/2 \\ O_1 = 0 \end{cases} \quad (3)$$

In some examples, a high frequency enhancement filter may provide a refined picture that is sharper than the reconstructed input picture. An example of high frequency enhancement filter coefficients and offsets are shown in Equation (4) (with reference to Equation (1)):

$$\begin{cases} C_2(-1,0) = C_2(1,0) = C_2(0,1) = C_2(0,-1) = -1/8 \\ C_2(-1,-1) = C_2(-1,1) = C_2(1,1) = C_2(1,-1) = -1/8 \\ C_2(0,0) = 2 \\ O_2 = 0 \end{cases} \quad (4)$$

In general, any number of fixed filters in any combination may be employed. In an example embodiment, two fixed filters may be employed (e.g., used to do the refining) with one fixed filter being a low pass filter that makes the predictive picture smoother and the other fixed filter being a high frequency enhancement filter that makes the predictive picture shaper. The low pass filter may use the coefficients and offsets of Equation (2) or (3) and the high frequency enhancement filter may use the coefficients and offsets of Equation (4), for example.

In some examples, a single fixed filter may be employed (and best refinement decision module 576 may not be employed) and the single fixed filter may include a low pass filter. For example, a single fixed filter using the coefficients and offsets of Equation (2) or (3) may be employed. In some examples, a fixed filter may be employed with offset values forced to zero. In some examples, a fixed filter may be employed with enhancement filter coefficient values be forced to zero.

As is discussed further below, in some embodiments, when fixed refining filtering may be applied to the inter layer prediction, a decision may be made as to whether the fixed refining filtering is on or off (e.g., whether fixed refining filtering is to be performed). Further, if multiple fixed filters (e.g., refine filters) are utilized or employed, which filter is chosen (e.g., an optimal fixed filter) also may be determined. Such a decision may be made at different levels. For example, the fixed filter(s) may be turned on or turned off at the sequence, layer, picture, slice, or block level. Further, which filter is employed to do the refining may also be switched at the sequence, layer, picture, slice, or block level. For example, the decision may be made by the encoder such that the encoder may determine the on/off of refining filter and choses the optimal filter, and then send flags to decoder to indicate the decision results.

In some examples, the decision as to which filter to apply (of multiple employed filters) may be made by local adaptive method. In one embodiment, the local properties of reconstructed reference layer video data 572 (e.g., a pre-filtering picture) may be evaluated or analyzed to determine the usage of the fixed filter (e.g., refining filter). For example, local edge information, gradient strength, local variance, or other measurements of reconstructed reference layer video data 572 may be used to make the decision(s). In some examples, both the encoder and the decoder may perform the same (or similar) procedures and generate identical or substantially identical decision(s). In such examples, no additional flag(s) may be needed in the encoded bitstream.

As discussed, local edge information, gradient strength, local variance, or other measurements of reconstructed reference layer video data 572 may be used to make the decision as to which filter to apply. For example, if a low-pass filter and a high-pass filter are used, a variable optimal filter index may be used to specify which filter may be optimal. In the following example, an optimal filter index of 0 may indicate the low-pass filter is optimal and an optimal filter index of 1 may indicate the high-pass filter is optimal. Assuming a block B with a size N×N, an optimal filter decision may be given as shown in equation (5):

$$\text{optimal\_filter\_index} = \begin{cases} 0, & \text{if } func(B) \leq TH \\ 1, & \text{if } func(B) > TH \end{cases} \quad (5)$$

where TH may be a threshold value (such as a predetermined threshold or a heuristically determined threshold or the like), and func(•) may be a measurement of the block.

As discussed, in various examples, local edge information, gradient strength, local variance, or other measurements of reconstructed reference layer video data 572. In examples where local edge information is used, func(•) may be a measurement of local edge information of a current block, which may be determined as shown in equations (6), (7), and (8):

$$G_x(i,j) = B(i-1, j+1) - B(i-1, j-1) + \\ 2B(i, j+1) - 2B(i, j-1) + B(i+1, j+1) - B(i+1, j-1) \quad (6)$$

$$G_y(i,j) = B(i+1, j-1) - B(i-1, j-1) + \\ 2B(i+1, j) - 2B(i+1, j) + B(i+1, j+1) - B(i-1, j+1) \quad (7)$$

where i and j may be counter variables, B may be a value associated with the block, and G may be associated with local edge information.

In examples where gradient strength is used, func(•) may be a measurement of gradient strength of a current block, which may be determined as shown in equation (9):

$$func_{edge}(B) = \left(\sum_{j=0}^{N}\sum_{i=0}^{N}(|G_x(i,j)| + |G_y(i,j)|)\right) / N \times N \quad (8)$$

where i and j may be counter variables and B may be a value associated with the block.

In examples where local variance is used, func(•) may be a measurement of local variance of a current block, which may be determined as shown in equations (10) and (11):

$$func_{gradient}(B) = \left(\begin{array}{c}\sum_{j=0}^{N}\sum_{i=1}^{N}|B(i,j) - B(i-1,j)| + \\ \sum_{j=1}^{N}\sum_{i=0}^{N}|B(i,j) - B(i,j-1)|\end{array}\right) / 2N \times (N-1) \quad (9)$$

where i and j may be counter variables and B may be a value associated with the block.

Although discussed with respect to a block level, the techniques described above with respect to equations (5) through (11) may be implemented at any level such as, for example, a picture, a slice, or a block level, or the like. Further, although presented with respect to two applied filters, the described techniques may extended to any number of filters.

Figure 6:
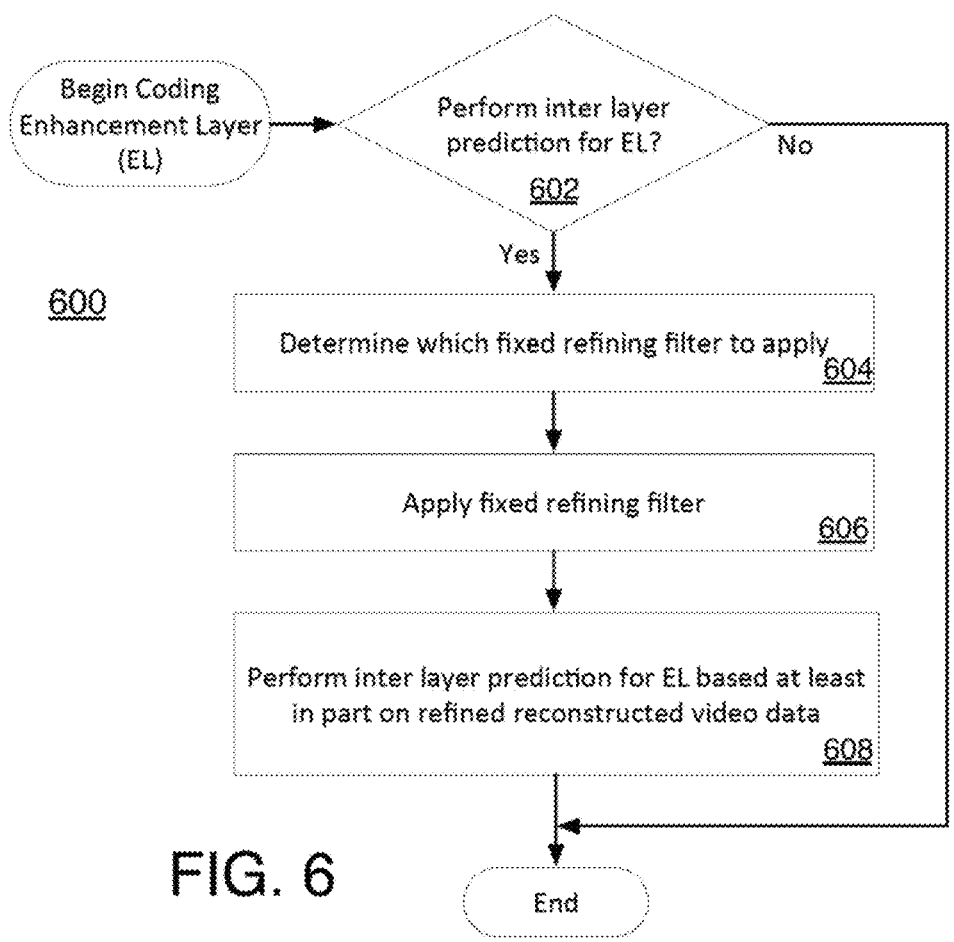
FIG. 6 is a flow diagram illustrating an example process.

FIG. 6 is a flow diagram illustrating an example process 600, arranged in accordance with at least some implementations of the present disclosure. Process 600 may include one or more operations, functions or actions as illustrated by one or more of blocks 602, 604, 606, and/or 608 of FIG. 6. Process 600 may form at least part of a scalable video coding process. By way of non-limiting example, process 600 may form at least part of a scalable video decoding process for one or more enhancement layers as undertaken by decoder system 400 of FIG. 4 although process 600 or portions thereof may be undertaken to form at least part of a scalable video encoding process as discussed herein.

Further, process 600 will be described herein in reference to scalable video coding system 700 of FIG. 7. FIG. 7 is an illustrative diagram of an example system 700, arranged in accordance with at least some implementations of the present disclosure. As shown in FIG. 7, system 700 may include processor 702, SVC codec module 706, and memory 708. Processor 702 may instantiate SVC codec module 706 to provide for inter layer prediction in accordance with the present disclosure. In the example of system 700, memory 708 may store video content. SVC codec module 706 may be provided by any combination of software, firmware, and/or hardware. In some examples SVC codec module 706 or, more generally, a logic module, may include an inter layer prediction module, which may be configured to apply a fixed refining filter to reconstructed reference layer video data to generate refined reconstructed video data and/or a enhancement layer video coder perform inter layer prediction for an enhancement layer associated with the video data based at least in part on the refined reconstructed video data.

Memory 708 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 708 may be implemented by cache memory.

Returning to discussion of FIG. 6, process 600 may begin at decision block 602, "Perform inter layer prediction EL?", where a determination may be made regarding whether inter layer prediction should be performed for an enhancement layer. If inter layer prediction is to be performed then process 600 may continue at block 604, if, however, inter layer prediction is not to be performed, then process 600 may end. In some examples, such as decoder implementations, determining whether inter layer prediction is to be performed may include accessing a bit stream to determine an indicator (e.g., a bit stream flag) such that the indicator specifies whether to perform inter prediction or to apply the fixed refining filtering or the like.

Process 600 may continue at block 604, "Determine which fixed refining filter to apply", where, for a current sequence, layer, picture, slice, or block, which of multiple fixed refining filters may be employed, a determination may be made as to which fixed refining filter to apply. As discussed, in some examples, a single fixed refining filter may be employed. In such examples, block 604 may be skipped. In decoder examples where multiple fixed refining filters are employed, determining which fixed refining filter to employ may include accessing a bit stream to determine a fixed refining filter indicator that indicates which fixed refining filter of the multiple fixed refining filters to apply. In encoder examples (and decoder examples where no fixed refining filter indicator is provided), determining which fixed refining filter to employ may include evaluating reconstructed reference video data and/or evaluating multiple fixed refining filter results (e.g., refined reconstructed video data) to determine a chosen fixed refining filter, as discussed herien.

Process 600 may conclude at block 606, "Apply fixed refining filter", where the single or chosen fixed refining filter may be applied to the reconstructed reference video data to generate refined reconstructed video data. As discussed, in some examples, each fixed refining filter may already have been applied and the resultant data may have been used to choose the fixed filter. In such examples, block 606 may be skipped or may include transferring the chosen refined reconstructed video data or the like. Process 600 may continue at block 608, "Perform inter layer prediction for EL based at least in part on refined reconstructed video data", where inter layer prediction may be performed for an enhancement layer associated with the video data as discussed herein.

As discussed, in various implementations, prior to performing refining filtering, lower layer processing may be performed. Such processing may include, for example, up-sampling for spatial scalability or tone mapping for bit-depth scalability or the like.

As discussed, in various implementations, portions of process 600, such as the determination of whether to perform inter layer prediction at block 602, may be undertaken in response to an indication provided to a decoder in, for instance, a bit stream. FIG. 8 is an illustrative diagram of an example bit stream 800, such as bit streams 140, 226, 342, or 401, or the like, arranged in accordance with at least some implementations of the present disclosure. As shown in FIG. 8, bit stream 800 may include a header portion 802 and a data portion 804. Header portion 802 may include one or more indicators 806. For example, indicators 806 may include an indicator or flag 808 whose value specifies whether or not to perform inter layer prediction or apply a fixed refining filtering, as described herein, for a current sequence, layer, picture, slice, or block of an enhancement layer. In addition, bit stream 800 may include other information such as one or more fixed refining filter indicators 810 to indicate which fixed refining filter of multiple fixed refining filters to apply as described above. As discussed, in some examples, each fixed refining filter may apply coefficients and offsets that may be particular to that fixed refining filter such that choosing which fixed refining filter to apply may select the coefficients and/or offsets to be applied.

Various components of the systems described herein may be implemented in software, firmware, and/or hardware and/or any combination thereof. For example, various components of system 300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

FIG. 9 is a flow chart illustrating an example video coding process 900, arranged in accordance with at least some implementations of the present disclosure. In the illustrated implementation, process 900 may include one or more operations, functions or actions as illustrated by one or more of blocks 902 and/or 904. By way of non-limiting example, process 900 will be described herein with reference to example video coding system 200 or the video system including encoding system 300 and decoding system 400. Process 900, as illustrated, may be directed to encoding or decoding and the concepts and/or operations described may be applied in the same or similar manner to coding in general.

Process 900 may be utilized as a computer-implemented method for performing scalable video coding. Process 900 may begin at operation 902, "Apply A Fixed Refining Filter To Reconstructed Reference Layer Video Data To Generate Refined Reconstructed Video Data", where a fixed refining filter may be applied to reconstructed reference layer video data to generate refined reconstructed video data. For example, refined reconstructed video data 265 may be generated at refining filtering module 262 of inter layer prediction module 260 of system 200 or refined reconstructed video data 365 may be generated at refining filtering module 362 of inter layer prediction module 360 of system 300, for example. As discussed, the refined reconstructed video data may include refined data based on a fixed filter that may include taking the dot product of the reconstructed reference layer video data and filter coefficients and adding offset values and a variety of effects may be implemented via the coefficients and offset values.

Processing may continue from operation 902 to operation 904, "Perform Inter Layer Prediction For An Enhancement Layer Associated With The Video Data Based At Least In Part On The Refined Reconstructed Video Data", where inter layer prediction may be performed for an enhancement layer associated with the video data based at least in part on the refined reconstructed video data. Inter layer prediction may be performed at enhancement layer encoder 204 of system 200 or enhancement layer decoder 304 of system 300, for example.

In general, process 900 may be repeated any number of times either serially or in parallel for any number of sequences, layers, pictures, slices, or blocks of video data of the enhancement layer and/or for any number of frames of data, or the like. The resultant inter layer prediction may be used to encode a bitstream or to generate output video data (e.g., an enhancement layer frame or frames) for presentment via a display device, for example. Some additional and/or alternative details related to process 900 may be illustrated in one or more examples of implementations discussed herein and, in particular, with respect to FIG. 10 below.

Figure 10:
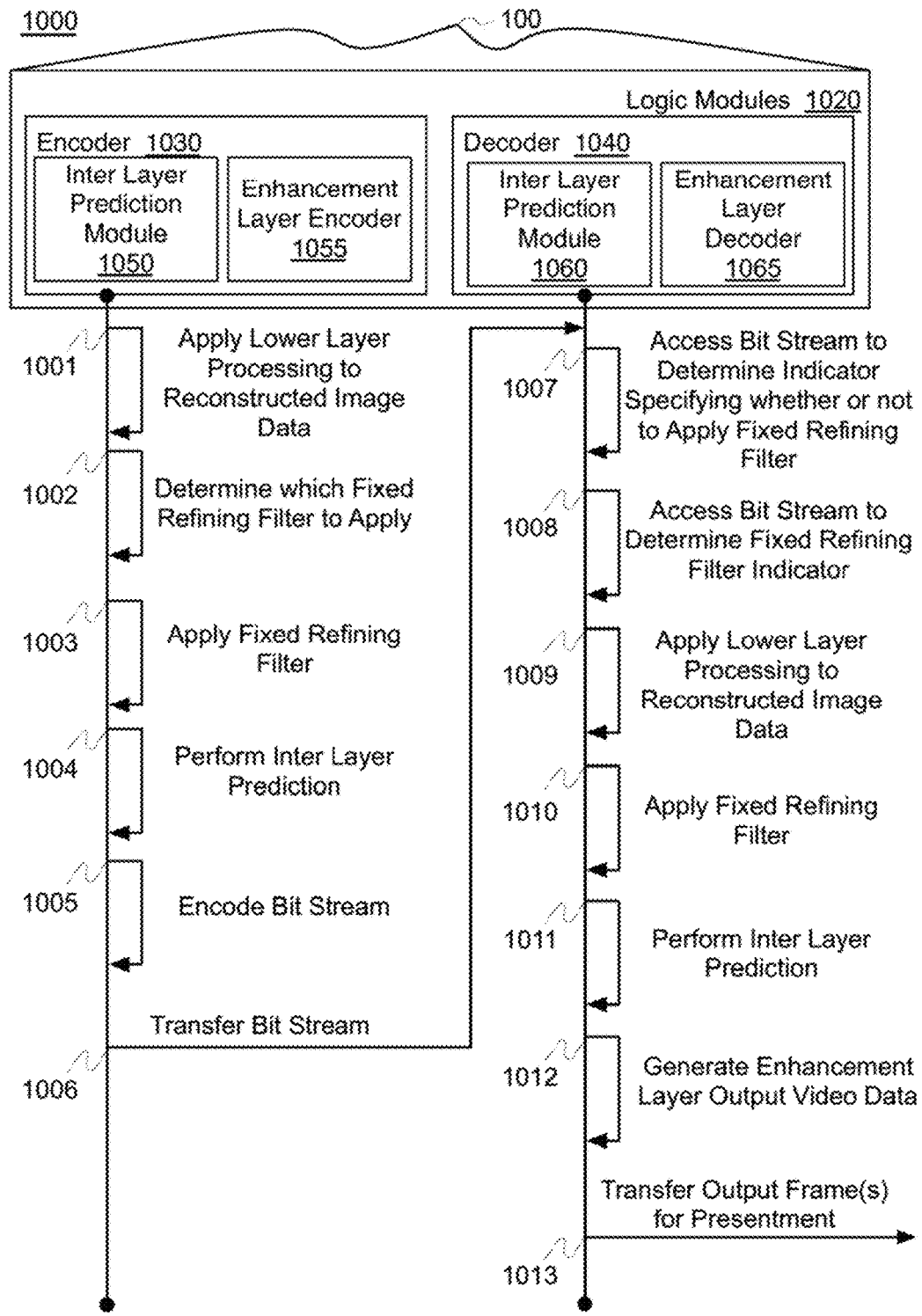
FIG. 10 is an illustrative diagram of an example video coding process in operation.

FIG. 10 is an illustrative diagram of example video coding system 100 and video coding process 1000 in operation, arranged in accordance with at least some implementations of the present disclosure. In the illustrated implementation, process 1000 may include one or more operations, functions or actions as illustrated by one or more of actions 1001, 1002, 1003, 1004, 1005, 1006, 1007, 1008, 1009, 1010, 1011, 1012, 1013, and/or 1014. By way of non-limiting example, process 1000 will be described herein with reference to the example video coding system including encoder system 300 of FIG. 3 and decoder system 400 of FIG. 4.

In the illustrated implementation, video coding system 100 may include logic modules 1020, the like, and/or combinations thereof. For example, logic modules 1020, may include encoder 1030 (which may correspond to encoders 201 or 300, for example), which may include inter layer prediction module 1050 and enhancement layer encoder 1055 and decoder 1040 (which may correspond to decoders 203 or 400, for example), which may include inter layer prediction module 1060 and enhancement layer decoder 1065. Although video coding system 100, as shown in FIG. 10, may include one particular set of blocks or actions associated with particular modules, these blocks or actions may be associated with different modules than the particular module illustrated here. Although process 1000, as illustrated, is directed to encoding and decoding, the concepts and/or operations described may be applied to encoding and/or decoding separately, and, more generally, to video coding.

Process 1000 may begin at block 1001, "Apply Lower Layer Processing to Reconstructed Image Data", where lower layer processing may be applied to reconstructed image data. In various examples, the lower layer processing may include up-sampling for spatial scalability or tone mapping for bit-depth scalability or the like. For example, reconstructed base layer video data 315 may be processed by lower layer processing module 364. In some examples, the lower layer processing may be implemented via inter layer prediction module 1050.

Process 1000 may continue from block 1001 to block 1002, "Determine which Fixed Refining Filter to Apply", where which fixed refining filter to apply may be determined. As discussed, in some examples, the determination may prior to applying a fixed refining filter and the determination may be made from multiple employed fixed refining filters based on an evaluation of the reconstructed reference layer video data. For example, the evaluation may be based at least in part on a local adaptive method such that the evaluation includes evaluating local edge information of the reconstructed reference layer video data, gradient strength of the reconstructed reference layer video data, or local variance of the reconstructed reference layer video data.

Also as discussed, in other examples, multiple fixed refining filters may each generate an associated refined picture and the determination of which fixed refining filter to use may be based on the generated refined pictures. The determination may be made based on any suitable comparison of the refined pictures such as a comparison of refined pictures to the picture of the reconstructed reference layer video data, for example. In such examples, block 1002 may be performed after block 1003, as needed.

Process 1000 may continue from block 1002 to block 1003, "Apply Fixed Refining Filter", where a fixed refining filter may be applied to reconstructed reference layer video data to generate refined reconstructed video data. As discussed, in some examples, the fixed refining filter may include a chosen refining filter and in other examples, multiple fixed refining filters may be applied and a best choice among the generated data may be used. In yet other examples, only a single fixed refining filter may be employed and used. In such examples, block 1002 may be skipped. In some examples, the fixed refining filter may be applied via inter layer prediction module 1050.

Process 1000 may continue at block 1004, "Perform Inter Layer Prediction", where inter layer prediction for an enhancement layer associated with the video data based at least in part on the refined reconstructed video data. For example, enhancement layer encoder 304 may perform inter layer prediction based at least in part on refined reconstructed video data 365. In some examples, inter layer prediction may be performed by enhancement layer encoder 1055.

Process 1000 may continue from block 1004 to block 1005, "Encode Bit Stream", where a bit stream may be encoded based at least in part on the inter layer prediction. In some examples, the bit stream may be encoded with residual coding. As discussed, in some examples the bit stream may be encoded an indicator that specifies whether to apply the fixed refining filter and/or a fixed refining filter indicator configured to indicate which fixed refining filter of multiple fixed refining filters (if employed) to apply. For example, a bit stream may be encoded by entropy encoder 340 or the like.

Process 1000 may continue from block 1005 to block 1006, "Transfer Bit Stream", where the encoded bit stream may be transferred. As shown the encoded bitstream may be transferred to a decoder 1040. As discussed, encoder 1030 may be associated with and/or provided by a content provider system and decoder 1040 may be associated with a client system. Therefore, in various implementations, encoder 1030 and decoder 1040 may be implemented substantially independent of one another. In various examples, the bit stream may be transferred via the Internet, via a memory device, or the like. As will be appreciated, in some implementations, the bit stream may be transferred to multiple devices either serially or in parallel.

Process 1000 may continue from block 1006 or begin at block 1007, "Access Bit Stream to Determine Indicator Specifying whether or not to Apply Fixed Refining Filter", where a bit stream associated with video data may be accessed to determine an indicator that may specify whether to apply fixed refined filtering. The indicator may be accessed by decoder 300, for example. In some examples, the indicator may include a bit stream flag. If fixed refined filtering is not applied (or if inter layer prediction is not to be performed), then process 1000 may skip to block 1012.

If fixed refined filtering is to be performed, process 1000 may continue at block 1008 (if a refining filter indicator has been provided via the bit stream), "Access Bit Stream to Determine Fixed Refining Filter Indicator", where a bit stream associated with the video data may be accessed to determine a fixed refining filter indicator. As discussed, in some examples, a fixed refining filter indicator may be encoded in a bit stream for decoding. If no fixed refining filter indicator has been encoded in the bit stream (and multiple fixed refining filters are employed), which fixed refining filter to employ may be determined as discussed with respect to 1002 and 1003 and elsewhere herein.

Process 1000 may continue at block 1009, "Apply Lower Layer Processing to Reconstructed Image Data", where lower layer processing may be applied to reconstructed image data. In various examples, the lower layer processing may include up-sampling for spatial scalability or tone mapping for bit-depth scalability or the like, as discussed. For example, reconstructed base layer video data 415 may be processed by lower layer processing module 464. In some examples, the lower layer processing may be implemented via inter layer prediction module 1060.

Process 1000 may continue from block 1009 to block 1010, "Apply Fixed Refining Filter", where a fixed refining filter may be applied to reconstructed reference layer video data to generate refined reconstructed video data. As discussed, in some examples, applying the fixed refining filter may include a chosen refining filter (either based on accessing a received bit stream or based on a determination at the decoder) and in other examples, multiple fixed refining filters may be applied and a best choice among the generated data may be used. In yet other examples, only a single fixed refining filter may be employed and used. In such examples, block 1008 may be skipped.

Process 1000 may continue at block 1011, "Perform Inter Layer Prediction", where inter layer prediction for an enhancement layer associated with the video data based at least in part on the refined reconstructed video data. For example, enhancement layer decoder 304 may perform inter layer prediction based at least in part on refined reconstructed video data 365. In some examples, inter layer prediction may be performed by enhancement layer decoder 1165.

Process 1000 may continue from block 1011 to block 1012, "Generate Enhancement Layer Output Video Data", where an enhancement layer output video data associated with the enhancement layer may be generated based at least in part on the inter layer prediction. For example, enhancement layer decoder 404 may generate enhancement layer output video 406.

Process 1000 may continue from block 1012 to block 1013, "Transfer Output Video Data for Presentment", where the output video data may be transferred for presentment. For example, output video data may be presented to a user via a display device.

While implementation of the example processes herein may include the undertaking of all blocks shown in the order illustrated, the present disclosure is not limited in this regard and, in various examples, implementation of the example processes herein may include the undertaking of only a subset of the blocks shown and/or in a different order than illustrated.

In addition, any one or more of the blocks discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of video systems 200, 300, or 400, SVC codec module 706, inter layer prediction module 1050 or 1060, or the like, or any other module or component as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
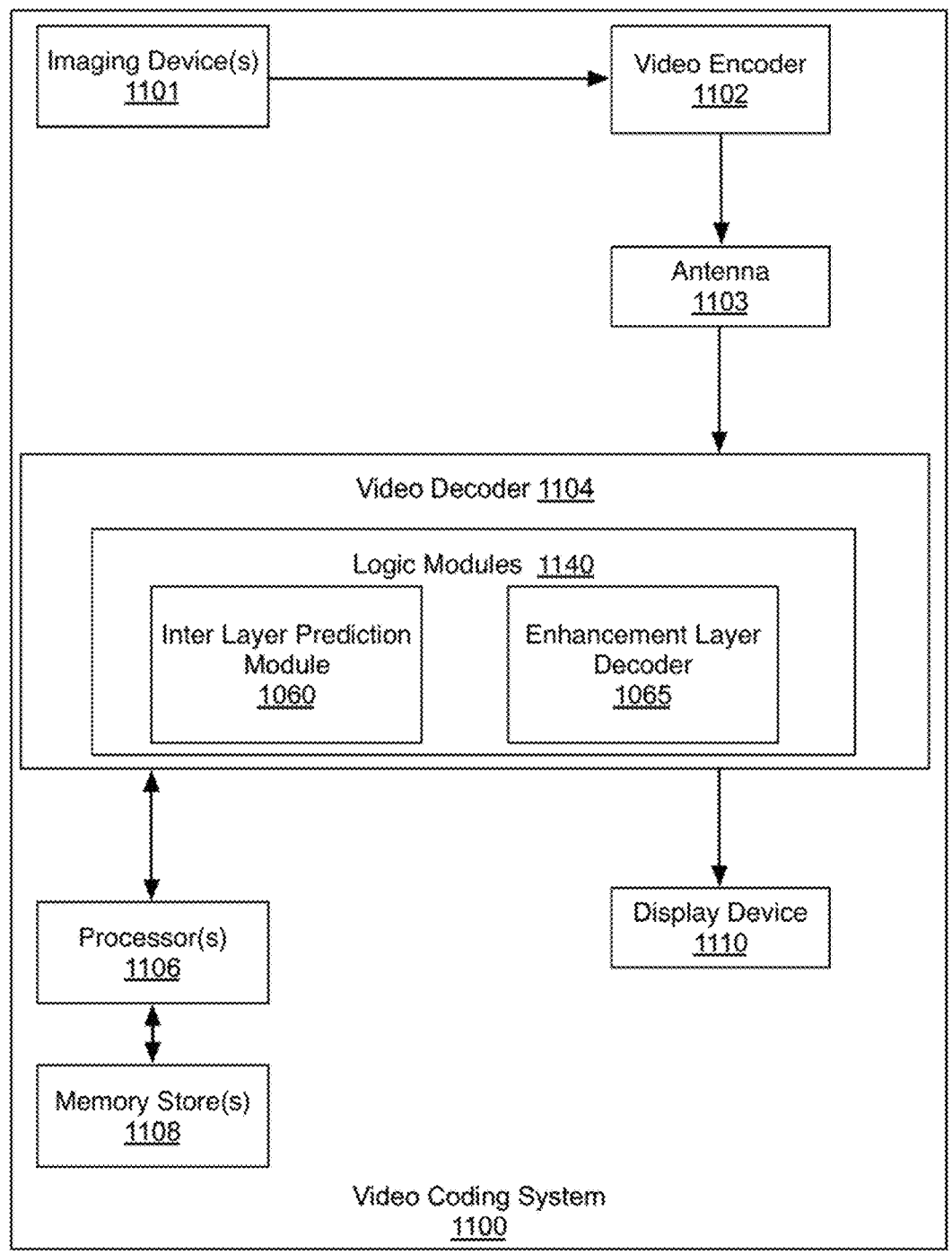
FIG. 11 is an illustrative diagram of an example video coding system.

FIG. 11 is an illustrative diagram of an example video coding system 1100, arranged in accordance with at least some implementations of the present disclosure. In the illustrated implementation, video coding system 1100 may include imaging device(s) 1101, a video encoder 1102, an antenna 1103, a video decoder 1104, one or more processors 1106, one or more memory stores 1108, a display device 1110, and/or logic modules 1140. Logic modules 1140 may include inter layer prediction module 1060 and/or enhancement layer decoder 1065, the like, and/or combinations thereof. As discussed above, in various examples, inter layer prediction module 1060 may be implemented via enhancement layer decoder 1065 or via a base layer decoder, which is not shown in FIG. 11 for the sake of clarity. In some examples, video encoder 1102 may implement one or more logic modules including an inter layer prediction module 1050 and/or enhancement layer encoder 1055, for example.

As illustrated, antenna 1103, video decoder 1104, processor 1106, memory store 1108, and/or display device 1110 may be capable of communication with one another and/or communication with portions of logic modules 1140. Similarly, imaging device(s) 1101 and video encoder 1102 may be capable of communication with one another and/or communication with portions of logic modules 1140. Accordingly, video decoder 1104 may include all or portions of logic modules 1140, while video encoder 1102 may include similar logic modules. Although video coding system 1100, as shown in FIG. 11, may include one particular set of blocks or actions associated with particular modules, these blocks or actions may be associated with different modules than the particular module illustrated here.

In some examples, video coding system 1100 may include antenna 1103, video decoder 1104, the like, and/or combinations thereof. Antenna 1103 may be configured to receive an encoded bitstream of video data. Video decoder 1104 may be communicatively coupled to antenna 1103 and may be configured to decode the encoded bitstream. Video decoder 1104 may be configured to apply a fixed refining filter to reconstructed reference layer video data to generate refined reconstructed video data and perform inter layer prediction for an enhancement layer associated with the video data based at least in part on the refined reconstructed video data.

In other examples, video coding system 1100 may include display device 1110, one or more processors 1106, one or more memory stores 1108, inter layer prediction module 1060, the like, and/or combinations thereof. Display device 1110 may be configured to present video data. Processors 1106 may be communicatively coupled to display device 1110. Memory stores 1108 may be communicatively coupled to the one or more processors 1106. Inter layer prediction module 1060 of video decoder 1104 (or video encoder 1102 in other examples) may be communicatively coupled to the one or more processors 1106 and may be configured to apply a fixed refining filter to reconstructed reference layer video data to generate refined reconstructed video data. Enhancement layer decoder 1065 may be communicatively coupled to the one or more processors 1106 and configured to perform inter layer prediction for an enhancement layer associated with the video data based at least in part on the refined reconstructed video data, such that the presentment of image data via display device 1110 may be based at least in part on the inter layer prediction.

In various embodiments, logic modules 1140 may be implemented in hardware, while software may implement other logic modules. For example, in some embodiments, inter layer prediction module 1060 and/or enhancement layer decoder 1065 may be implemented by application-specific integrated circuit (ASIC) logic while other logic modules may be provided by software instructions executed by logic such as processors 1106. However, the present disclosure is not limited in this regard and logic modules 1140 and/or other logic modules may be implemented by any combination of hardware, firmware and/or software. In addition, memory stores 1108 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1108 may be implemented by cache memory.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 12:
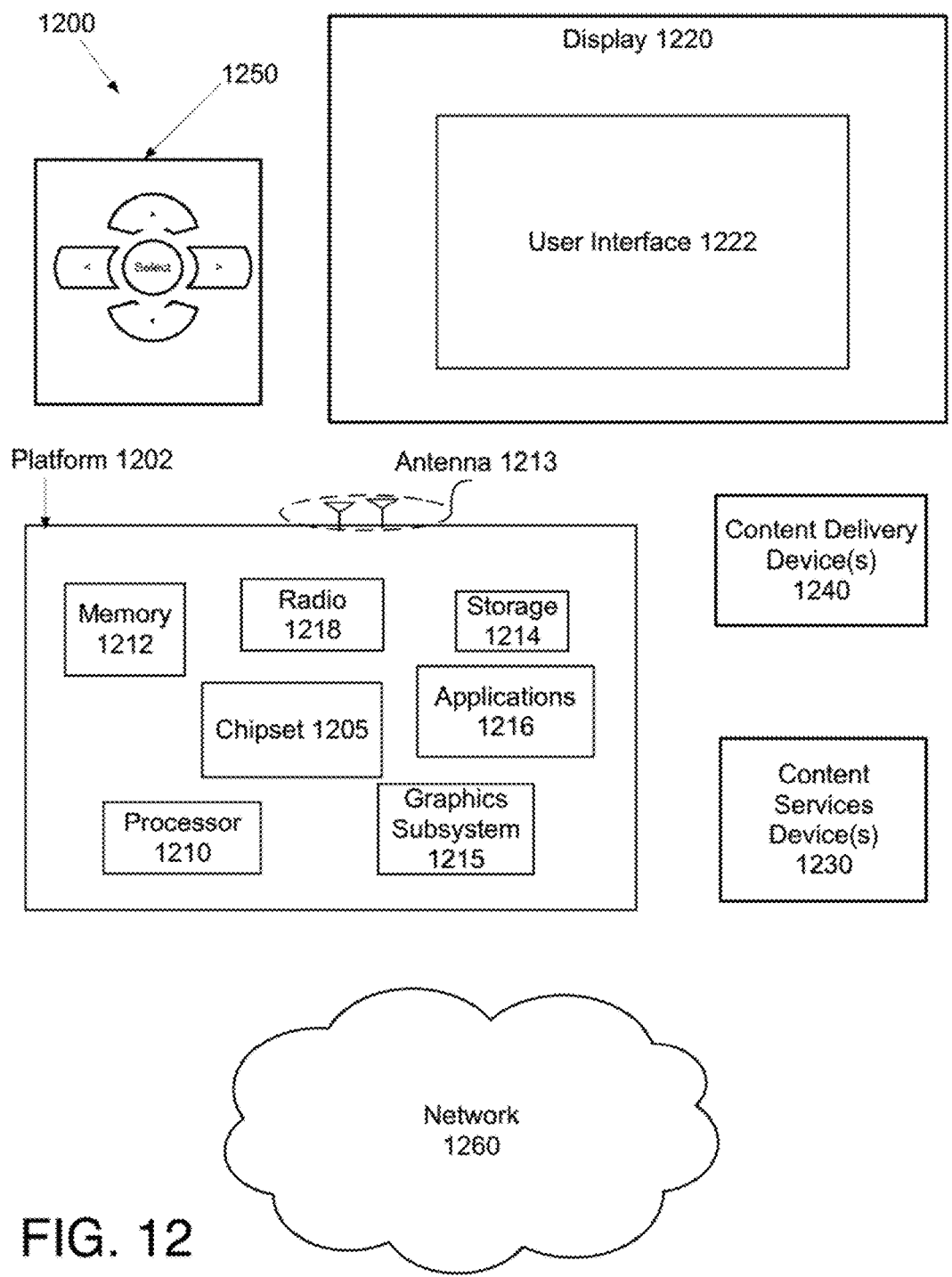
FIG. 12 is an illustrative diagram of an example system.

FIG. 12 is an illustrative diagram of an example system 1200, arranged in accordance with at least some implementations of the present disclosure. In various implementations, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
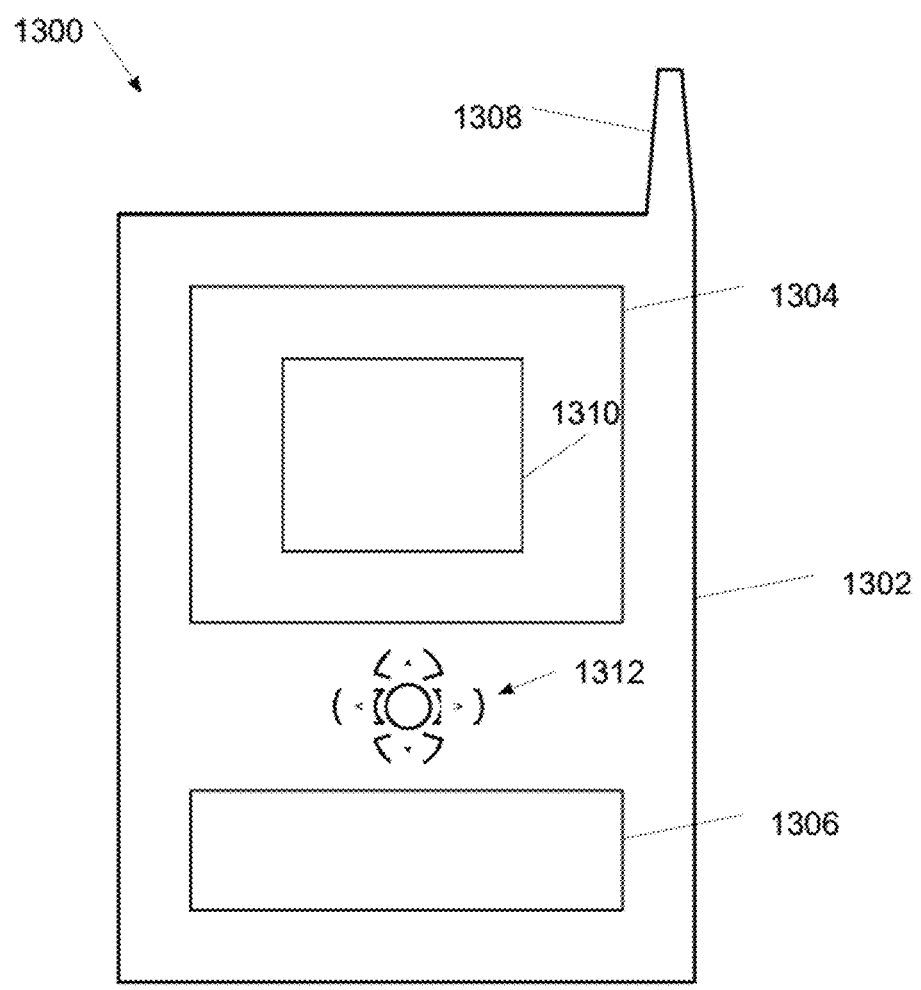
FIG. 13 illustrates an example device, all arranged in accordance with at least some implementations of the present disclosure.

As described above, system 1200 may be embodied in varying physical styles or form factors. FIG. 13 illustrates implementations of a small form factor device 1300 in which system 1300 may be embodied. In various embodiments, for example, device 1300 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing 1302, a display 1304, an input/output (I/O) device 1306, and an antenna 1308. Device 1300 also may include navigation features 1312. Display 1304 may include any suitable display unit for displaying information appropriate for a mobile computing device. I/O device 1306 may include any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for performing scalable video coding may include applying a fixed refining filter to reconstructed reference layer video data to generate refined reconstructed video data. Inter layer prediction may be performed for an enhancement layer associated with the video data based at least in part on the refined reconstructed video data.

In another example, a computer-implemented method for performing scalable video coding may further include applying, prior to applying the fixed refining filter, lower layer processing to the reconstructed image data such that the lower layer processing may include up-sampling for spatial scalability or tone mapping for bit-depth scalability. Prior to applying the fixed refining filter, it may be determined to apply the fixed refining filter from multiple employed fixed refining filters based at least in part on an evaluation of the reconstructed reference layer video data. The evaluation may be based at least in part on a local adaptive method. The evaluation may include evaluating local edge information of the reconstructed reference layer video data, gradient strength of the reconstructed reference layer video data, or local variance of the reconstructed reference layer video data. A bit stream may be encoded based at least in part on the inter layer prediction. The bit stream may be encoded with residual coding. Encoding the bit stream may include encoding the bit stream with an indicator such that the indicator specifies whether to apply the fixed refining filter. The indicator may include a bit stream flag. The bit stream may be encoded with a fixed refining filter indicator that may indicate which fixed refining filter of multiple fixed refining filters to apply. The bit stream associated with the video data may be accessed to determine the indicator. The indicator may specify whether to apply the fixed refining filter. The indicator may include the bit stream flag. The bit stream associated with the video data may be accessed to determine the fixed refining filter indicator configured to indicate which fixed refining filter of the multiple fixed refining filters to apply. Enhancement layer output video data associated with the enhancement layer may be generated based at least in part on the inter layer prediction. Applying the fixed refining filter may include employing a single fixed refining filter. The single fixed refining filter may include a low pass filter. Applying the fixed refining filter may include employing multiple fixed refining filters and applying the fixed refining filter of the multiple fixed refining filters. Applying the fixed refining filter may include taking the dot product of the reconstructed reference layer video data and filter coefficients and adding offset values such that applying the fixed refining filter may include applying the fixed refining filter to a filter window of the reconstructed reference layer video data. The multiple fixed refining filters may include a symmetric fixed refining filter, an asymmetric fixed refining filter, a one-dimensional fixed refining filter, a separable two-dimensional fixed refining filter, a non-separable two-dimensional fixed refining filter, a spatial smoothing filter, a spatial sharpening filter, a particular histogram band enhancement filter, a particular histogram band pass filter, a low frequency enhancement filter, a high frequency enhancement filter, a particular frequency band enhancement filter, a high-pass frequency filter, a band-pass frequency filter, or a low-pass frequency filter. Applying the fixed refining filter may include employing the fixed refining filter and a second fixed refining filter, and applying the fixed refining filter. The fixed refining filter may provide a first enhancement effect and the second fixed refining filter may provide a second enhancement effect. The first enhancement effect and the second enhancement effect may be different. The first enhancement effect may include a low frequency enhancement effect, a high frequency enhancement effect, an enhancement effect within a particular frequency band, a spatial smoothing filter, a spatial sharpening filter, a particular histogram band enhancement filter, or a particular histogram band pass filter. Applying the second fixed refining filter may include taking the dot product of the reconstructed reference layer video data and second filter coefficients and adding second offset values. The second offset values for the second fixed refining filter may be different than the offset values for the fixed refining filter. The fixed refining filter may include a low pass filter and the second fixed refining filter may include a high frequency enhancement filter. The reconstructed reference layer video data may include at least one of a picture, a slice, or a block. The reconstructed reference layer video data may be associated with a reference layer of the video data The reference layer may include at least one of a base layer or a second enhancement layer such that the enhancement layer is a higher layer than the second enhancement layer and such that the reference layer and the enhancement layer differ by a scalability. The scalability may include a quality scalability, a temporal scalability, or a bit depth scalability. The reference layer may include a base layer and the enhancement layer may include a level 1 enhancement layer. Performing the inter layer prediction may include performing inter layer prediction via at least one of an enhancement layer decoder or a base layer decoder. The enhancement layer decoder may be implemented, at least in part, via hardware. Performing the inter layer prediction may include performing inter layer prediction via at least one of an enhancement layer encoder or a base layer encoder.

In other examples, a system for video coding on a computer may include a display device, one or more processors, one or more memory stores, an inter layer prediction module, and an enhancement layer video coder, the like, and/or combinations thereof. The display device may be configured to present video data. The one or more processors may be communicatively coupled to the display device. The one or more memory stores may be communicatively coupled to the one or more processors. The inter layer prediction module may be communicatively coupled to the one or more processors and configured to perform inter layer prediction for an enhancement layer associated with the video data based at least in part on the refined reconstructed video data. The enhancement layer video coder may be communicatively coupled to the one or more processors and configured to perform inter layer prediction for an enhancement layer associated with the video data based at least in part on the refined reconstructed video data. The presentment of image data via the display device may be based at least in part on the inter layer prediction.

In a further example system, the inter layer prediction module may be further configured to apply, prior to application of the fixed refining filter, lower layer processing to the reconstructed image data. The lower layer processing may include up-sampling for spatial scalability or tone mapping for bit-depth scalability. The inter layer prediction module may be further configured to determine, prior to application of the fixed refining filter, to apply the fixed refining filter from multiple employed fixed refining filters based at least in part on an evaluation of the reconstructed reference layer video data. The evaluation may be based at least in part on a local adaptive method. The evaluation may include evaluating local edge information of the reconstructed reference layer video data, gradient strength of the reconstructed reference layer video data, or local variance of the reconstructed reference layer video data. The enhancement layer video coder may be further configured to encode a bit stream based at least in part on the inter layer prediction. The bit stream may be encoded with residual coding. The bit stream may be encoded with an indicator that specifies whether to apply the fixed refining filter. The indicator may include a bit stream flag. The enhancement layer video coder may be further configured to encode the bit stream with a fixed refining filter indicator configured to indicate which fixed refining filter of multiple fixed refining filters to apply. The enhancement layer video coder may be further configured to access the bit stream associated with the video data to determine the indicator. The indicator may be configured to specify whether to apply the fixed refining filter. The indicator may include the bit stream flag. The enhancement layer video coder may be further configured to access the bit stream associated with the video data to determine the fixed refining filter indicator configured to indicate which fixed refining filter of the multiple fixed refining filters to apply. The enhancement layer video coder may be further configured to generate enhancement layer output video data associated with the enhancement layer based at least in part on the inter layer prediction. The inter layer prediction module may be configured to apply the fixed refining filter by use of a single fixed refining filter. The single fixed refining filter may include a low pass filter. The inter layer prediction module may be configured to apply the fixed refining filter by use of multiple fixed refining filters and application of the fixed refining filter of the multiple fixed refining filters to the reconstructed reference layer video data. The inter layer prediction module may be configured to apply the fixed refining filter by determination of a dot product of the reconstructed reference layer video data and filter coefficients and addition of offset values. Application of the fixed refining filter may include application of the fixed refining filter to a filter window of the reconstructed reference layer video data. The multiple fixed refining filters may include at least one of a symmetric fixed refining filter, an asymmetric fixed refining filter, a one-dimensional fixed refining filter, a separable two-dimensional fixed refining filter, a non-separable two-dimensional fixed refining filter, a spatial smoothing filter, a spatial sharpening filter, a particular histogram band enhancement filter, a particular histogram band pass filter, a low frequency enhancement filter, a high frequency enhancement filter, a particular frequency band enhancement filter, a high-pass frequency filter, a band-pass frequency filter, or a low-pass frequency filter. The inter layer prediction module may be configured to apply the fixed refining filter by use of the fixed refining filter and a second fixed refining filter, and application of the fixed refining filter to the reconstructed video data. The fixed refining filter may be configured to provide a first enhancement effect and the second fixed refining filter be configured to provide a second enhancement effect. The first enhancement effect and the second enhancement effect may be different. The first enhancement effect may include at least one of a low frequency enhancement effect, a high frequency enhancement effect, an enhancement effect within a particular frequency band, a spatial smoothing filter, a spatial sharpening filter, a particular histogram band enhancement filter, or a particular histogram band pass filter. The inter layer prediction module may be configured to apply the second fixed refining filter by determination of a dot product of the reconstructed reference layer video data and second filter coefficients and addition of second offset values. The second offset values for the second fixed refining filter may be different than the offset values for the fixed refining filter. The fixed refining filter may include a low pass filter and the second fixed refining filter may include a high frequency enhancement filter. The reconstructed reference layer video data may include at least one of a picture, a slice, or a block. The reconstructed reference layer video data may be associated with a reference layer of the video data. The reference layer may include at least one of a base layer or a second enhancement layer such that the enhancement layer is a higher layer than the second enhancement layer. The reference layer and the enhancement layer may differ by a scalability. The scalability may include at least one of a quality scalability, a temporal scalability, or a bit depth scalability. The reference layer may include a base layer and the enhancement layer may include a level 1 enhancement layer. The inter layer prediction module may be implemented via the enhancement layer video coder or a base layer video coder. The enhancement layer video coder may be at least one of an enhancement layer video decoder or an enhancement layer video encoder.

In further examples, embodiments may include the following components:

(1) A mechanism to perform refining filters to improve the inter layer prediction of scalable video codec implementation; (a) A mechanism to improve SVC inter layer prediction by applying refine filtering on processed lower layer reconstructed pictures. (Here the lower layer reconstructed picture processing may include, for example, up-sampling for spatial scalability, tone mapping for bit-depth scalability, or passing through without any processing. The refine filtering aims to reduce the differences/distortion between the input pixels of an enhancement layer and the processed reconstructed pixels of its lower layer.)

(2) A mechanism to use multiple fixed filters with offsets to improve the inter layer prediction; (a) In some embodiments, the offset values may be forced to zero; (b) In some embodiments, the fixed filter coefficients may be forced to zero and only offset values works; (c) In some embodiments, only one fixed filter with offset may be used; (d) In some embodiments, more than one fixed filter sets with offsets may be used.

(3) A mechanism to perform multiple fixed filters with different enhancement effects to improve the inter layer prediction; (a) In some embodiments, the filter enhancing the low frequency of the picture may be used to generate a smoother predictive picture; (b) In some embodiments, the filter enhancing the high frequency of the picture may be used to generate a shaper predictive picture; (c) In some embodiments, the filter enhancing a certain band of frequency of the picture may be used to generate a specific predictive picture.

(4) A mechanism to apply the refining filter at different level to improve the inter layer prediction. (a) The refining filter may be turned on or turned off at sequence/layer/picture/slice/block level; (b) The best filter may be switched at sequence/layer/picture/slice/block level.

(5) A mechanism to adaptively decide the usage of refining filter to improve the inter layer prediction; (a) In some embodiments, the decisions that if the refine filtering may be applied and which filter is used to do the refining may be made by encoder and flags may sent in bitstream to the decoder to indicate the decisions; (b) In some embodiments, the decisions that if the refine filtering is applied and which filter is used to do the refining are made by analyzing the local property of the pre-filtering picture. The local edge information, gradient strength, local variance and other measurements can be used to determine the usage of refining filter. Both the encoder and decoder perform the same procedure and generate identical decision, thus no additional flag is needed in the bitstream.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for performing scalable video coding, comprising:
    applying, by the processor of a scalable video encoder, lower layer processing to a reconstructed reference layer video picture to generate a processed reconstructed reference layer video picture, wherein the lower layer processing comprises at least one of up-sampling for spatial scalability or tone mapping for bit-depth scalability, and wherein the reconstructed reference layer video picture corresponds to an enhancement layer picture;
    applying, by the processor, a plurality of fixed inter layer refining filters with different enhancement effects to the processed reconstructed reference layer video picture, wherein the fixed inter layer refining filters comprise a low frequency enhancement filter, a high frequency enhancement filter, and a particular frequency band enhancement filter;
    selecting, by the processor, for each of multiple blocks of the processed reconstructed reference layer video picture, an individual fixed refining filter from the plurality of fixed inter layer refining filters based on evaluations of each of the multiple blocks, wherein selecting the individual fixed refining filter for an individual block of the multiple blocks comprises selecting a particular one of the plurality of fixed inter layer refining filters that reduces pixel prediction distortion between input pixels of an enhancement layer picture and pixels of the individual block as refined by the plurality of fixed inter layer refining filters;
    performing, by the processor, inter layer prediction for the enhancement layer picture to generate enhancement layer video data based at least in part on the selected particular one of the plurality of fixed inter layer refining filters;
    generating, by the processor, a fixed refining filter indicator corresponding to the selected particular one of the plurality of fixed inter layer refining filters; and
    encoding, by the processor, a scalable bitstream with the fixed refining filter indicator corresponding to the selected particular one of the plurality of fixed inter layer refining filters.

2. The method of claim 1, further comprising:
    generating, by the processor, prior to applying the lower layer processing, the reconstructed reference layer video picture via a base layer encoder of the scalable video encoder.

3. The method of claim 1, wherein the scalable bitstream further comprises a second indicator to indicate fixed refining filtering is not to be applied to a second reconstructed reference layer video picture represented by the scalable bitstream.

4. The method of claim 1, further comprising:
    encoding, by the processor, the enhancement layer video data into the scalable bitstream.

5. The method of claim 1, wherein applying the particular one of the plurality of fixed inter layer refining filters to the individual block comprises taking the dot product of pixel data of the processed reconstructed reference layer video picture corresponding to the first individual block and filter coefficients and adding offset values, wherein the filter coefficients and the offset values correspond to the particular one of the plurality of fixed inter layer refining filters.

6. A system for performing scalable video coding decoding comprising:
    one or more memory stores; and
    one or more processors coupled to the one or more memory stores, the one or more processors to:
        apply lower layer processing to a reconstructed reference layer video picture to generate a processed reconstructed reference layer video picture, wherein to apply the lower layer processing comprises the one or more processors to apply at least one of up-sampling for spatial scalability or tone mapping for bit-depth scalability, and wherein the reconstructed reference layer video picture corresponds to an enhancement layer picture;
        apply a plurality of fixed inter layer refining filters with different enhancement effects to the processed reconstructed reference layer video picture, wherein the fixed inter layer refining filters comprise a low frequency enhancement filter, a high frequency enhancement filter, and a particular frequency band enhancement filter;

select, for each of multiple blocks of the processed reconstructed reference layer video picture, an individual fixed refining filter from the plurality of fixed inter layer refining filters based on evaluations of each of the multiple blocks, wherein to select the individual fixed refining filter for an individual block of the multiple blocks comprises the one or more processors to select a particular one of the plurality of fixed inter layer refining filters that reduces pixel prediction distortion between input pixels of an enhancement layer picture and pixels of the individual block as refined by the plurality of fixed inter layer refining filters;

perform inter layer prediction for the enhancement layer picture to generate enhancement layer video data based at least in part on the selected particular one of the plurality of fixed inter layer refining filters;

generate a fixed refining filter indicator corresponding to the selected particular one of the plurality of fixed inter layer refining filters; and encode a scalable bitstream with the fixed refining filter indicator corresponding to the selected particular one of the plurality of fixed inter layer refining filters.

7. The system of claim 6, wherein the one or more processors are further to:

generate, prior to applying the lower layer processing, the reconstructed reference layer video picture via a base layer encoder.

8. The system of claim 6, wherein the scalable bitstream further comprises a second indicator to indicate fixed refining filtering is not to be applied to a second reconstructed reference layer video picture represented by the scalable bitstream.

9. The system of claim 6, wherein the one or more processors are further to:

encode the enhancement layer video data into the scalable bitstream.

10. The system of claim 6, wherein to apply the particular one of the plurality of fixed inter layer refining filters to the individual block comprises the one or more processors to take the dot product of pixel data of the processed reconstructed reference layer video picture corresponding to the individual block and filter coefficients and to add offset values, wherein the filter coefficients and the offset values correspond to the particular one of the plurality of fixed inter layer refining filters.

11. At least one non-transitory machine readable medium comprising a plurality of instructions that, in response to being executed on a computing device, cause the computing device to perform scalable video coding by:

applying, by the processor of a scalable video encoder, lower layer processing to a reconstructed reference layer video picture to generate a processed reconstructed reference layer video picture, wherein the lower layer processing comprises at least one of up-sampling for spatial scalability or tone mapping for bit-depth scalability, and wherein the reconstructed reference layer video picture corresponds to an enhancement layer picture;

applying, by the processor, a plurality of fixed inter layer refining filters with different enhancement effects to the processed reconstructed reference layer video picture, wherein the fixed inter layer refining filters comprise a low frequency enhancement filter, a high frequency enhancement filter, and a particular frequency band enhancement filter;

selecting, by the processor, for each of multiple blocks of the processed reconstructed reference layer video picture, an individual fixed refining filter from the plurality of fixed inter layer refining filters based on evaluations of each of the multiple blocks, wherein selecting the individual fixed refining filter for an individual block of the multiple blocks comprises selecting a particular one of the plurality of fixed inter layer refining filters that reduces pixel prediction distortion between input pixels of an enhancement layer picture and pixels of the individual block as refined by the plurality of fixed inter layer refining filters;

performing, by the processor, inter layer prediction for the enhancement layer picture to generate enhancement layer video data based at least in part on the selected particular one of the plurality of fixed inter layer refining filters;

generating, by the processor, a fixed refining filter indicator corresponding to the selected particular one of the plurality of fixed inter layer refining filters; and encoding, by the processor, a scalable bitstream with the fixed refining filter indicator corresponding to the selected particular one of the plurality of fixed inter layer refining filters.

12. The machine readable medium of claim 11, wherein the scalable bitstream further comprises a second indicator to indicate fixed refining filtering is not to be applied to a second reconstructed reference layer video picture represented by the scalable bitstream.

13. The machine readable medium of claim 11, comprising further instructions that, in response to being executed on the computing device, cause the computing device to perform scalable video coding by:

generating, prior to applying the lower layer processing, the reconstructed reference layer video picture via a base layer encoder.

14. The machine readable medium of claim 11, comprising further instructions that, in response to being executed on the computing device, cause the computing device to perform scalable video coding by:

encoding, by the processor, the enhancement layer video data into the scalable bitstream.

15. The machine readable medium of claim 11, wherein applying the particular one of the plurality of fixed inter layer refining filters to the individual block comprises taking the dot product of pixel data of the processed reconstructed reference layer video picture corresponding to the individual block and filter coefficients and adding offset values, wherein the filter coefficients and the offset values correspond to the particular one of the plurality of fixed inter layer refining filters.

* * * * *